US011668143B2

(12) United States Patent
Li et al.

(10) Patent No.: US 11,668,143 B2
(45) Date of Patent: Jun. 6, 2023

(54) DEPLOYING WELLBORE PATCH FOR MITIGATING LOST CIRCULATION

(71) Applicant: Saudi Arabian Oil Company, Dhahran (SA)

(72) Inventors: Bodong Li, Dhahran (SA); Chinthaka Pasan Gooneratne, Dhahran (SA); Timothy E. Moellendick, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 373 days.

(21) Appl. No.: 16/708,834

(22) Filed: Dec. 10, 2019

(65) Prior Publication Data
US 2021/0172269 A1 Jun. 10, 2021

(51) Int. Cl.
*E21B 33/13* (2006.01)
*E21B 21/00* (2006.01)
*E21B 47/117* (2012.01)
*C09K 8/516* (2006.01)
*E21B 33/138* (2006.01)
*E21B 47/12* (2012.01)

(52) U.S. Cl.
CPC ............ *E21B 21/003* (2013.01); *C09K 8/516* (2013.01); *E21B 33/138* (2013.01); *E21B 47/117* (2020.05); *E21B 47/12* (2013.01)

(58) Field of Classification Search
CPC ...... E21B 21/003; E21B 33/138; C09K 8/516
USPC ........................................................ 166/292
See application file for complete search history.

(56) References Cited

U.S. PATENT DOCUMENTS

| 2,927,775 | A | | 3/1960 | Hildebrandt |
| 3,028,915 | A | | 4/1962 | Jennings |
| 3,102,599 | A | | 9/1963 | Hillburn |
| 3,656,564 | A | | 4/1972 | Brown |
| 4,064,211 | A | | 12/1977 | Wood |
| 4,191,493 | A | * | 3/1980 | Hansson ............... E21B 33/127 156/294 |
| 4,365,677 | A | | 12/1982 | Owens |

(Continued)

FOREIGN PATENT DOCUMENTS

| CN | 104612669 | 5/2015 |
| CN | 205876305 | 1/2017 |

(Continued)

OTHER PUBLICATIONS

U.S. Appl. No. 16/831,426, filed Mar. 26, 2020, Li et al.

(Continued)

*Primary Examiner* — William D Hutton, Jr.
*Assistant Examiner* — Ashish K Varma
(74) *Attorney, Agent, or Firm* — Fish & Richardson P.C.

(57) ABSTRACT

Systems, methods, and apparatuses for deploying a lost circulation fabric (LCF) to seal a lost circulation zone during a drilling operation. The LCF may be contained within a lost circulation fabric deployment system (LCFDS) that is coupled to a tubular of a drilling string. The LCFDS may include a controller and sensors to detect the presence of a lost circulation zone and deploy the LCF upon detection of the lost circulation zone. In some implementations, a plurality of LCFDSs may be disposed on the tubular and work in cooperation to deploy a plurality of LCFs to form a seal along the lost circulation zone.

25 Claims, 15 Drawing Sheets

(56) References Cited

U.S. PATENT DOCUMENTS

| | | | |
|---|---|---|---|
| 4,464,993 | A | 8/1984 | Porter |
| 4,501,337 | A | 2/1985 | Dickinson et al. |
| 5,388,648 | A | 2/1995 | Jordan, Jr. |
| 5,429,198 | A | 7/1995 | Anderson et al. |
| 5,501,248 | A | 3/1996 | Kiest, Jr. |
| 5,803,666 | A | 9/1998 | Keller |
| 5,853,049 | A | 12/1998 | Keller |
| RE36,362 | E | 11/1999 | Jackson |
| 6,012,526 | A | 1/2000 | Jennings et al. |
| 6,170,531 | B1 | 1/2001 | Jung et al. |
| 6,371,306 | B2 | 4/2002 | Adams et al. |
| 6,561,269 | B1 | 5/2003 | Brown et al. |
| 6,637,092 | B1 | 10/2003 | Menzel |
| 7,387,174 | B2 | 6/2008 | Lurie |
| 7,455,117 | B1 | 11/2008 | Hall et al. |
| 7,789,148 | B2 | 9/2010 | Rayssiguier et al. |
| 8,176,977 | B2 | 5/2012 | Keller |
| 8,567,491 | B2 | 10/2013 | Lurie |
| 9,470,059 | B2 * | 10/2016 | Zhou ................... E21B 23/04 |
| 9,757,796 | B2 | 9/2017 | Sherman et al. |
| 9,903,010 | B2 | 2/2018 | Doud et al. |
| 9,976,381 | B2 | 5/2018 | Martin et al. |
| 10,233,372 | B2 | 3/2019 | Ramasamy et al. |
| 10,352,125 | B2 | 7/2019 | Frazier |
| 2002/0040812 | A1 | 4/2002 | Heying et al. |
| 2003/0159776 | A1 | 8/2003 | Graham |
| 2006/0185843 | A1 | 8/2006 | Smith |
| 2007/0017669 | A1 | 1/2007 | Lurie |
| 2009/0178809 | A1 | 7/2009 | Jeffryes et al. |
| 2009/0183875 | A1 | 7/2009 | Rayssiguier et al. |
| 2009/0255689 | A1 | 10/2009 | Kriesels et al. |
| 2010/0175882 | A1 | 7/2010 | Bailey et al. |
| 2011/0120732 | A1 * | 5/2011 | Lurie ................... E21B 7/20 166/382 |
| 2011/0220350 | A1 * | 9/2011 | Daccord ............. E21B 21/003 166/254.1 |
| 2011/0220416 | A1 | 9/2011 | Rives |
| 2012/0111578 | A1 | 5/2012 | Tverlid |
| 2013/0299241 | A1 | 11/2013 | Alberty et al. |
| 2014/0158369 | A1 * | 6/2014 | Radford ................ E21B 23/10 166/373 |
| 2014/0231068 | A1 | 8/2014 | Isaksen |
| 2015/0020908 | A1 | 1/2015 | Warren |
| 2015/0159467 | A1 | 6/2015 | Hartman et al. |
| 2016/0160106 | A1 | 6/2016 | Jamison et al. |
| 2017/0175446 | A1 | 6/2017 | Fraser et al. |
| 2018/0010030 | A1 | 1/2018 | Ramasamy et al. |
| 2018/0086962 | A1 | 3/2018 | Amanullah |
| 2018/0326679 | A1 | 11/2018 | Weisenberg et al. |
| 2019/0049054 | A1 | 2/2019 | Gunnarsson et al. |
| 2019/0194519 | A1 | 6/2019 | Amanullah |
| 2019/0257180 | A1 | 8/2019 | Kriesels et al. |
| 2019/0323332 | A1 | 10/2019 | Cuellar et al. |
| 2021/0172270 | A1 | 6/2021 | Li et al. |
| 2021/0172281 | A1 | 6/2021 | Li et al. |

FOREIGN PATENT DOCUMENTS

| | | |
|---|---|---|
| CN | 108240191 | 7/2018 |
| EP | 3034778 | 6/2016 |
| GB | 2155519 | 9/1985 |
| GB | 2357305 | 6/2001 |
| GB | 2466376 | 6/2010 |
| GB | 2484166 | 4/2012 |
| WO | 03/042494 | 5/2003 |
| WO | 2019027830 | 2/2019 |

OTHER PUBLICATIONS

U.S. Appl. No. 16/831,483, filed Mar. 26, 2020, Li et al.
U.S. Appl. No. 16/831,559, filed Mar. 26, 2020, Li et al.
U.S. Appl. No. 16/897,794, filed Jun. 10, 2020, Li et al.
U.S. Appl. No. 16/897,801, filed Jun. 10, 2020, Li et al.
U.S. Appl. No. 16/897,805, filed Jun. 10, 2020, Li et al.
PCT International Search Report and Written Opinion in International Appln. No. PCT/US2020/064215, dated Mar. 15, 2021, 13 pages.
PCT International Search Report and Written Opinion in International Appln. No. PCT/US2020/064220, dated Mar. 15, 2021, 15 pages.
PCT International Search Report and Written Opinion in International Appln. No. PCT/US2020/064198, dated Feb. 22, 2021, 13 pages.
PCT International Search Report and Written Opinion in International Appln. No. PCT/US2020/064203, dated Feb. 23, 2021, 14 pages.
PCT International Search Report and Written Opinion in International Appln. No. PCT/US2020/064219, dated Mar. 9, 2021, 13 pages.
International Search Report and Written Opinion issued in International Application No. PCT/US2018/044095 on Nov. 29, 2018, 14 pages.
Halliburton, "Drill Bits and Services Solutions Catalogs," retrieved from URL: <https://www.halliburton.com/content/dam/ps/public/sdbs/sdbs_contents/Books_and_Catalogs/web/DBS-Solution.pdf> on Sep. 26, 2019, Copyright 2014, 64 pages.
Zhang et al., "Increasing Polypropylene High Temperature Stability by Blending Polypropylene-Bonded Hindered Phenol Antioxidant," Macromolecules, 51(5), pp. 1927-1936, 2018, 10 pages.
Edition.cnn.com [online], "Revolutionary gel is five times stronger than steel," retrieved from URL <https://edition.cnn.com/style/article/hydrogel-steel-japan/index.html>, retrieved on Apr. 2, 2020, available on or before Jul. 16, 2017, 6 pages.
Nature.com [online], "Mechanical Behavior of a Soft Hydrogel Reinforced with Three-Dimensional Printed Microfibre Scaffolds," retrieved from URL <https://www.nature.com/articles/s41598-018-19502-y>, retrieved on Apr. 2, 2020, available on or before Jan. 19, 2018, 47 pages.
Wikipedia.org [online], "Surface roughness," retrieved from URL <https://en.wikipedia.org/wiki/Surface_roughness> retrieved on Apr. 2, 2020, available on or before Oct. 2017, 6 pages.
PCT International Search Report and Written Opinion in International Appln. No. PCT/US2020/064195, dated Feb. 26, 2021, 14 pages.
Corona et al., "Novel Washpipe-Free ICD Completion With Dissolvable Material," OTC-28863-MS, presented at the Offshore Technology Conference, Houston, TX, Apr. 30-May 3, 2018; 2018, OTC, 10 pages.
Gryphonoilfield.com [online], "Gryphon Oilfield Services, Echo Dissolvable Fracturing Plug," available on or before Jun. 17, 2020, retrieved on Aug. 20, 2020, retrieved from URL <https://www.gryphonoilfield.com/wp-content/uploads/2018/09/Echo-Series-Dissolvable-Fracturing-Plugs-8-23-2018-1.pdf>, 1 page.
Takahashi et al., "Degradation study on materials for dissolvable frac plugs," URTeC 2901283, presented at the Unconventional Resources Technology Conference, Houston, Texas, Jul. 23-25, 2018, 9 pages.
Tervesinc.com [online], Tervalloy™ Degradable Magnesium Alloys, available on or before Jun. 12, 2016, via Internet Archive: Wayback Machine URL <https://web.archive.org/web/20160612114602/http://tervesinc.com/media/Terves_8-Pg_Brochure.pd>, retrieved on Aug. 20, 2020, <http://tervesinc.com/media/Terves_8-Pg_Brochure.pdf>. 8 pages.
PCT International Search Report and Written Opinion in International Appln. No. PCT/US2020/064206, dated Apr. 1, 2021, 14 pages.
PCT International Search Report and Written Opinion in International Appln. No. PCT/US2020/064210, dated Apr. 1, 2021, 15 pages.
PCT International Search Report and Written Opinion in International Appln. No. PCT/US2020/064213, dated Apr. 1, 2021, 14 pages.
GCC Examination Report issued in Gulf Cooperation Council Appln. No. 2020-41086, dated Nov. 30, 2021, 4 pages.
GCC Examination Report issued in Gulf Cooperation Council Appln. No. 2020-41056, dated Dec. 6, 2021, 4 pages.

(56) References Cited

OTHER PUBLICATIONS

CN Office Action in Chinese Appln No. 202080086074.5, dated Sep. 29, 2022, with English Translation, 12 pages.

* cited by examiner

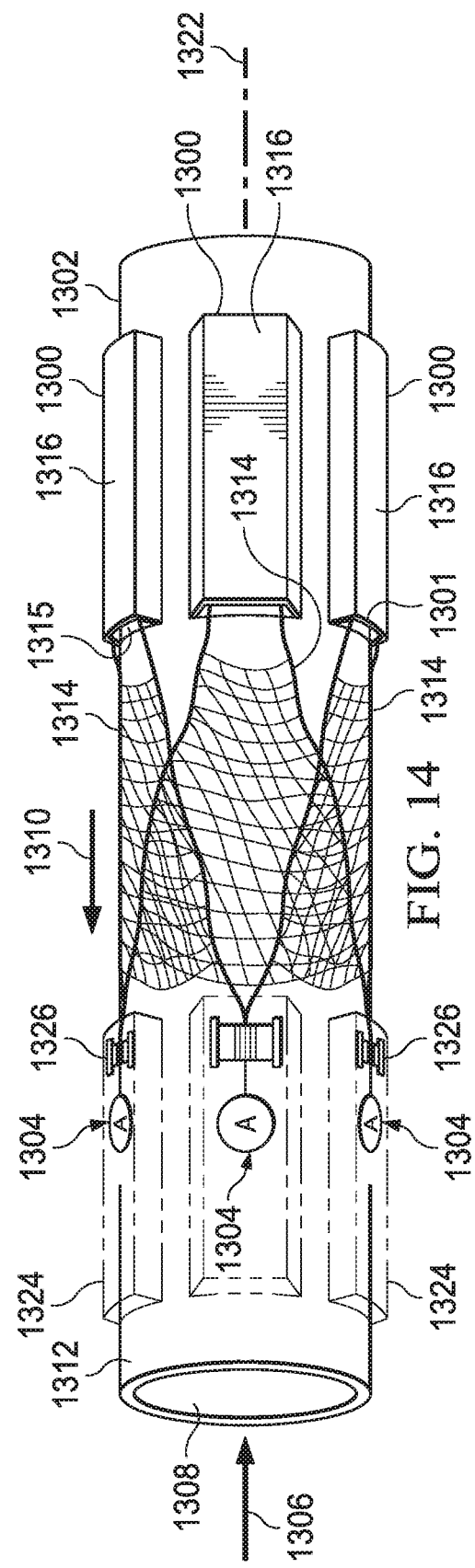

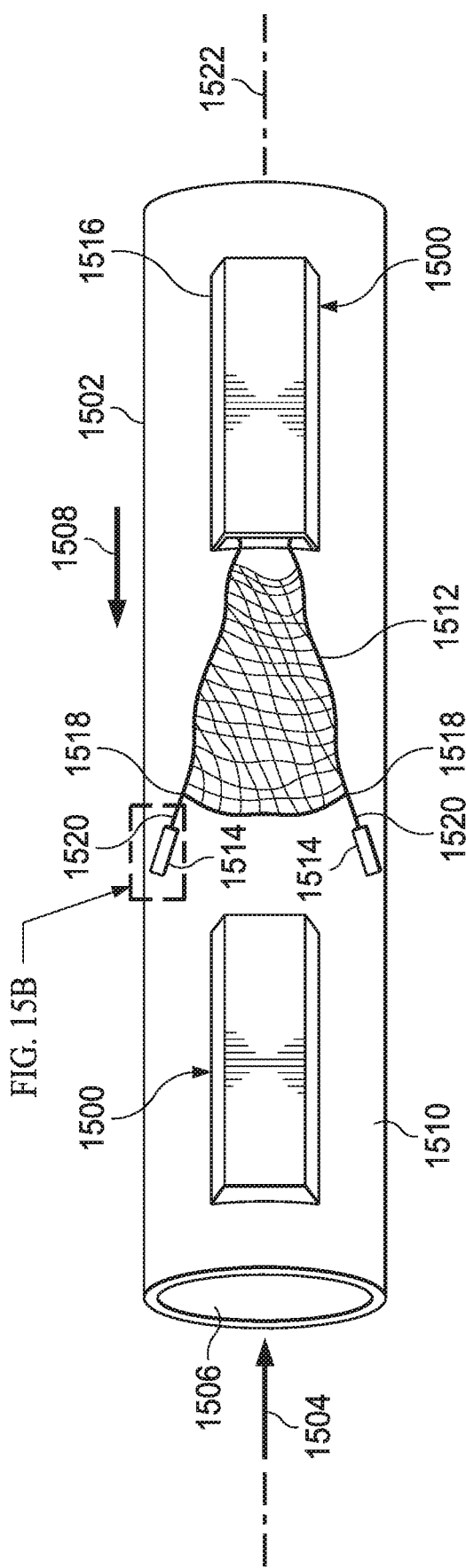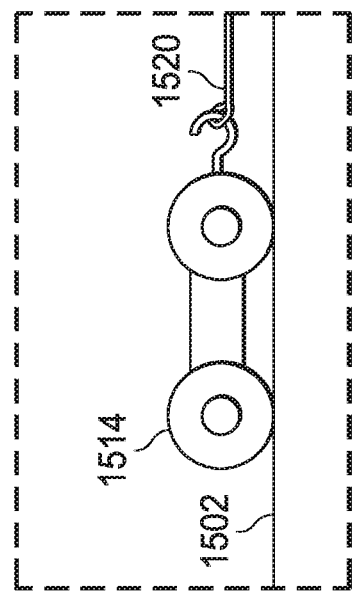
FIG. 15A
FIG. 15B

DEPLOYING WELLBORE PATCH FOR MITIGATING LOST CIRCULATION

TECHNICAL FIELD

The present disclosure relates to lost circulation mitigation and, more particularly, to lost circulation mitigation in the course of wellbore drilling.

BACKGROUND

During drilling of a wellbore, a reduction or total absence of returned drilling mud may be experienced. In these cases, the drilling mud is lost to natural fissures, fractures, or other geological features. This reduction or complete loss of drilling mud returning to the surface is termed lost circulation. Lost circulation results in increased drilling costs and extended drilling times.

SUMMARY

Some lost circulation fabric (LCF) deployment systems (LCFDS) for deploying an LCF at a lost circulation zone within a wellbore include: a housing configured to be coupled to a tubular, the housing defining a cavity; an opening formed in the housing, the opening providing communication between the cavity and an exterior of the housing; a door moveable between a closed position to cover the opening formed in the housing and an opened position to uncover the opening formed in the housing; an LCF disposed in the cavity; and a release system coupled to the LCF, the release system operable to move the door between the closed position and open position to permit deployment of the LCF.

A system for deploying a lost circulation fabric (LCF), the system including: a lost circulation fabric deployment system (LCFDS) configured to be coupled to a tubular, the LCFDS comprising: a housing defining a cavity; an opening formed in the housing, the opening providing communication between the cavity and an exterior of the housing; a door moveable between a closed position to cover the opening formed in the housing and an opened position to uncover the opening formed in the housing; an LCF disposed in the cavity; a float coupled to the LCF, the float operable to deploy the LCF; and a release system coupled to the LCF, the release system operable to move the door between the closed position and open to permit deployment of the LCF.

Embodiments of LCFDS can include one of more of the following features.

In some embodiments, LCFDSs also include a float coupled to the LCF, the float operable to deploy the LCF from the opening formed in the housing.

In some embodiments, the housing is sized and shaped to reside within an annular space within a wellbore between the tubular and a wall of the wellbore.

In some embodiments, the LCF includes a flexible mesh material. In some cases, the flexible mesh material is a fiber-reinforced polymer.

In some embodiments, LCFDSs also include a controller and a sensor, the controller operable to receive data from the sensor to detect the presence of a lost circulation zone and to actuate the release system to deploy the LCF in response to detection of a lost circulation zone.

In some embodiments, LCFDSs also include a launch system operable to forcefully eject the LCF from the opening formed in the housing during deployment of the LCF. In some cases the launch system includes a compressible spring that is operable to expand to forcefully eject the LCF. In some cases the launch system includes a platform moveable within the cavity of the housing, the platform operable to eject the LCF from the opening formed in the housing during deployment of the LCF.

In some embodiments, LCFDSs also include a first end and a second end, and further including a compressible spring disposed between the first end and the second end, the compressible spring configured to expand upon deployment of the LCF to separate the first end and the second end.

In some embodiments, LCFDSs also include an edge, and the float is coupled to the LCF along the edge.

In some embodiments, LCFDSs also include a plurality of LCFDSs in an annular arrangement and the LCFs of adjacent LCFDSs are coupled together. In some cases, the coupled LCFs form a unitary annular ring upon deployment of the LCFs. In some cases, the plurality of LCFDSs are configured to deploy coupled LCFs simultaneously.

The details of one or more implementations of the present disclosure are set forth in the accompanying drawings and the description that follows. Other features, objects, and advantages of the present disclosure will be apparent from the description and drawings, and from the claims.

DESCRIPTION OF DRAWINGS

FIGS. 13 and 14 are side views of a plurality of LCFDSs arranged about a circumference of a tubular having actuators operable to deploy the LCFs, according to some implementations of the present disclosure.

FIGS. 15A and 15B are side views of another example LCFDS coupled to a tubular and having actuators to deploy an LCF, according to some implementations of the present disclosure.

DETAILED DESCRIPTION

Figure 1:
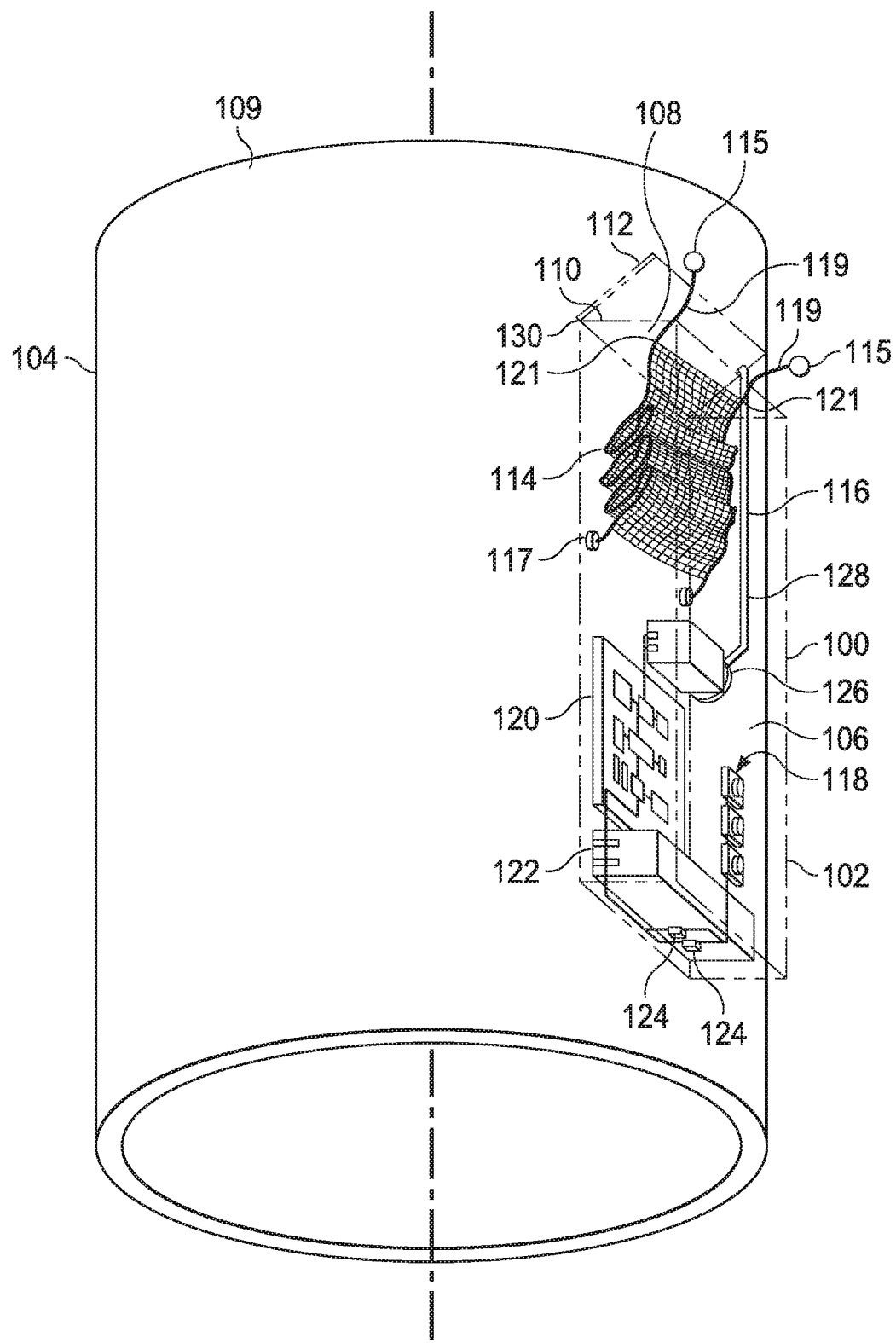
FIG. 1 is a schematic view of an example lost circulation fabric deployment system (LCFDS), according to some implementations of the present disclosure.

For the purposes of promoting an understanding of the principles of the present disclosure, reference will now be made to the implementations illustrated in the drawings, and specific language will be used to describe the same. Nevertheless, no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, steps, or a combination of these described with respect to one implementation may be combined with the features, components, steps, or a combination of these described with respect to other implementations of the present disclosure.

The present disclosure is directed to systems, methods, and apparatuses for reducing or preventing lost circulation during drilling of a wellbore. The systems, methods, and apparatuses to reduce or prevent lost circulation involve deploying a lost circulation fabric (LCF) in a wellbore to repair a lost circulation zone. In some implementations, the LCF is coupled to a tubular, such as a drilling tubular, and is released at a location in a wellbore proximate to a location along the wellbore where lost circulation occurs, also referred to as a loss zone. Differential pressure around the loss zone presses the LCF to the loss zone, forming a seal to stop or reduce lost circulation.

FIG. 1 is a schematic view of an example lost circulation fabric deployment system (LCFDS) 100. The LCFDS 100 includes a housing 102 coupled to a tubular 104. In some implementations, the tubular 104 may be a length of drilling pipe or other tubular component disposed in a wellbore. The housing 102 defines a cavity 106 and includes an opening 108 at a first end 110 of the housing 102 and a door 112 that is movable to cover and uncover the opening 108. In the illustrated example, the door 112 is disposed at the first end 110. In some implementations, when the LCFDS 100 is disposed within a well, the first end 110 corresponds to an uphole position within a wellbore. However, the scope of the disclosure is not so limited, and the first end 110 of the LCFDS 100 may have another orientation within a wellbore.

The cavity 106 accommodates an LCF 114, a release system 116, a separation system 117, one or more sensors 118, a controller 120, and a power supply 122. The LCF 114 is a pliable membrane, mesh, or net formed from a composite material, such as a fiber-reinforced polymer. The material selected to form the LCF 114 includes physical properties selected to withstand downhole environments. The fabric may have a high elastic modulus, high tensile strength, high surface roughness, good toughness, and good thermal stability to withstand harsh downhole environments. Specifically, harsh downhole conditions can refer to high temperatures up to 250 degrees Celsius, high pressures up to 20,000 pounds per square inch (psi), the existence of multiphase media (such as coexisting fluid, gas, and solid media), shock and vibration, confinement, and loss of fluid circulation. To withstand these conditions, the tensile strength of the material of the LCF 114 can be between 10 and 10,000 megapascals (MPa), the toughness can be between 1 and 100 kilojoules per square meter ($kJ/m^2$), and the thermal stability can be greater than or equal to 100 degrees Celsius. Polymers, such as nylon, polycarbonate, polypropylene, and high-temperature polyethylene may be used to form an LCF 114 within the scope of the present disclosure. High-temperature may refer to an ability of the material to retain its thermal stability in temperature ranges greater than the typical temperature range of commercially available types. For example, these polymers and others within the scope of the present disclosure may be used to form a fiber-reinforced polymer used to make the LCF 114. In other implementations, composites, such as carbon-reinforced polymers and glass fiber-reinforced polymers may be used to form LCFs within the scope of the present disclosure.

As shown in FIG. 1, the LCF 114 may be is stored within the housing 102 in a folded configuration prior to deployment. As a result of being folded, the LCF 114 is able to be stored in a compact size. Consequently, the LCFDS 100 obtains a compact size that facilitates use of the LCFDS 100 within the limited annular space formed between a drilling string and a wellbore during drilling. As a result, an LCFDS within the scope of the present disclosure forms a compact device that is operable to deploy an LCF having increased surface area for overlaying and sealing all or a portion of a lost circulation zone.

The LCF 114 includes floats 115 coupled to ends 121 of the LCF 114 via a connector 119. In some implementations, the connector 119 may be, for example, a cable, string, line, or cord. Although the LCF 114 is shown has having a pair of floats 115, other implementations may include additional floats or a single float. Further, in other implementations, the floats 115 may be arranged on the LCF 114 in other orientations, quantities, and configurations. The floats 115 may be less dense than the circulating mud in the returning mud flow traveling uphole along an exterior surface 109 of the tubular 104. Thus, the floats 115 are buoyant in the circulating mud. The buoyancy of the floats 115 along with the direction of the mud flow result in removal of the LCF 114 from the cavity 106 defined within the housing 102. The floats 115 are typically made of a material having a mass density less than the mass density of the mud and can have good mechanical strength and thermal stability. For example, the floats 115 can be made of a polymer material or a metal foam.

The controller 120 may be or include a computer. Non-limiting examples of computers within the scope of the disclosure are described in more detail below. In some implementations, the LCFDS 100 may also include one or more ports 124. Example ports 124 may include a charging port to provide electrical power, such as to recharge the power supply 122, and a communications port to transfer data to the controller 120, from the controller 120, or both. In some instances, a communications port may be used to download data sensed by one or more sensors. In some instances, a communications port may be used to alter settings of the controller 120 to affect functionality of the LCFDS 100. For example, a communications port may be used to load, alter, or remove a release strategy for an LCF 114, which may include the manner and the conditions under which the LCF is deployed. Also, a communications port may be used to download data from or upload data to the controller 120. In other implementations, the LCFDS 100 may include wireless communication functionality to enable the LCFDS 100 to transmit data, receive data, or both, wirelessly. For example, in some implementations, the LCFDS 100 may communication wirelessly with a computer or other electronic control device located, for example, at a surface of the earth.

The controller 120 is connected, via a wired or wireless connection, to the release system 116, the one or more sensors 118, and the one or more ports 124. The power supply 122 provides electrical power to the LCFDS 100, including the controller 120, the release system 116, the one or more sensors 118, the one or more ports 124, as well as any other component of the LCFDS 100 that uses electrical power. In some implementations, the power supply 122 may be recharged, such as via a charging port, or may be detachable and interchangeable with another power supply when a power level reaches a selected level. In the latter configuration, a power supply having a depleted power level may be replaced with another power supply to permit a rapid reuse of the LCFDS 100.

In some implementations, a housing 102 of an LCFDS 100 may be formed from a metal, a ceramic, a composite material (such as fiberglass or carbon fiber), or a carbon fiber ceramic material. Use of non-metallic materials may reduce friction between a tubular 104 and a surface of a wellbore, such as in extended-reach laterals, so as to reduce or eliminate a risk of casing budding. The housing of an LCFDS 100 may be applied directly to an outer surface of a tubular 104 or may be indirectly coupled to an outer surface of a tubular 104. Further, an LCFDS may be removable from a tubular or affixed to a tubular, as described in more detail later.

Figure 5:
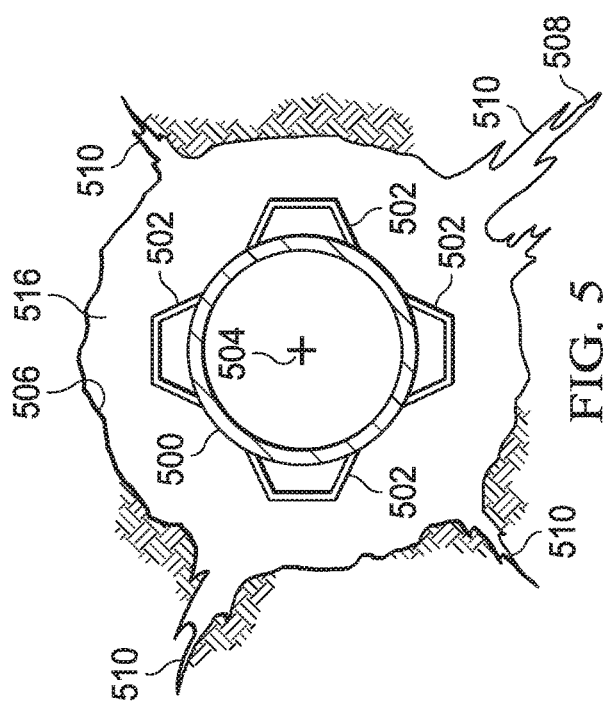
FIGS. 5-7 are views along a longitudinal axis of a tubular located within a wellbore and carrying a plurality of LCFDSs, according to some implementations of the present disclosure.
Figure 6:
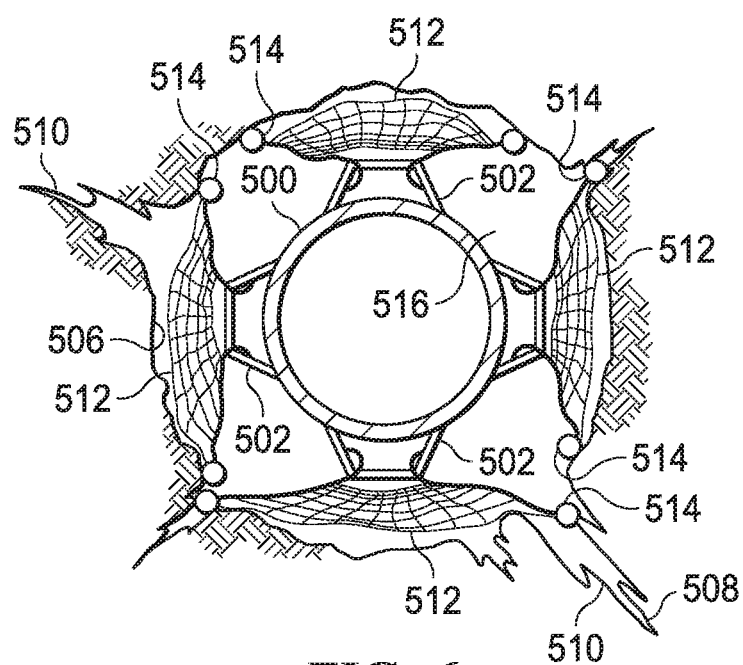
Figure 7:
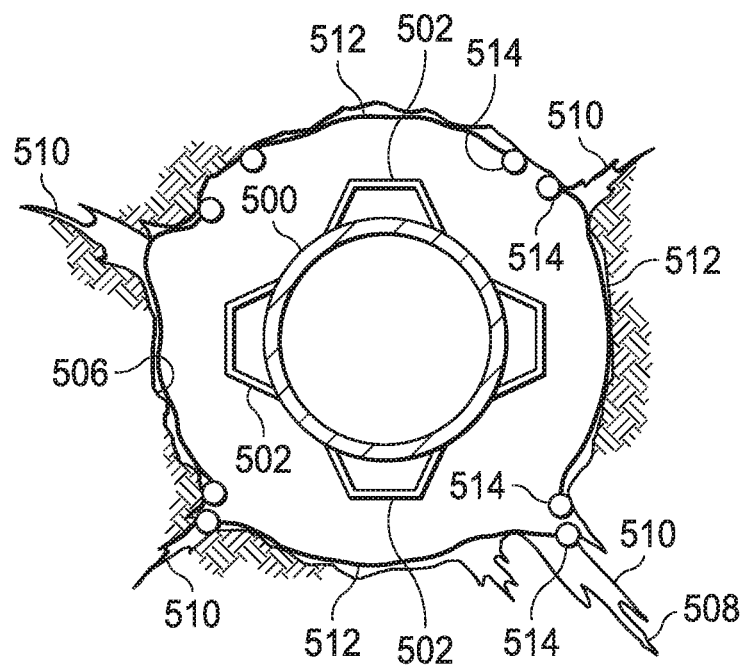

Although FIG. 1 shows a single LCFDS 100 coupled to a tubular, in other implementations, a plurality of LCFDS 100 may be coupled to a tubular 104. For example, in some implementations, LCFDSs may be deployed circumferentially about an exterior surface of a tubular as shown, for example, in FIGS. 5-7. As shown in FIGS. 5-7, four LCFDSs 502 are angularly offset from each other about a longitudinal axis 504 of the tubular 500 by 90°. However, other arrangements may be used. For example, three LCFDSs may be arranged circumferentially on a tubular, and each of the LCFDSs may be angularly offset from each other by 120°. However, the scope of the disclosure is even broader, and any number of LCFDSs may be disposed on a tubular and be arranged in any desirable way. Providing a plurality of LCFDSs on a tubular or a string of tubulars, such as a plurality of groups of circumferentially arranged LCFDSs, provides the ability to seal multiple loss zones without having to withdraw the tubular string from a wellbore. As a result, time is saved and a drilling process may be performed over the course of a reduced period of time.

Circumferential arrangements of the LCFDSs and, particularly, the housings of the LCFDSs, may serve another purpose. The housings of the LCFDSs may function as stabilizers on the tubulars to improve drilling operations. For example, as shown in FIGS. 5-7, the LCFDSs may be helpful for centering the tubular 500 within a wellbore 506. By centrally locating a tubular 500 within the wellbore 506, the LCFDSs 502 operate to define a uniform annular space between an interior wall of the wellbore 506 and an exterior surface of the tubular 500. The uniform annular space promotes uniform fluid flow around the tubular of drilling mud and formation cuttings to the surface, which may improve drilling performance.

In some implementations, one or more LCFDSs may be removable from a tubular. In other implementations, one or more LCFDSs may be permanently attached to a tubular. In a permanently attached implementation, after deployment an LCF, a new LCF may be installed while other components of the LCFDS may remain permanently installed within the housing of the LCFDS.

Figure 2:
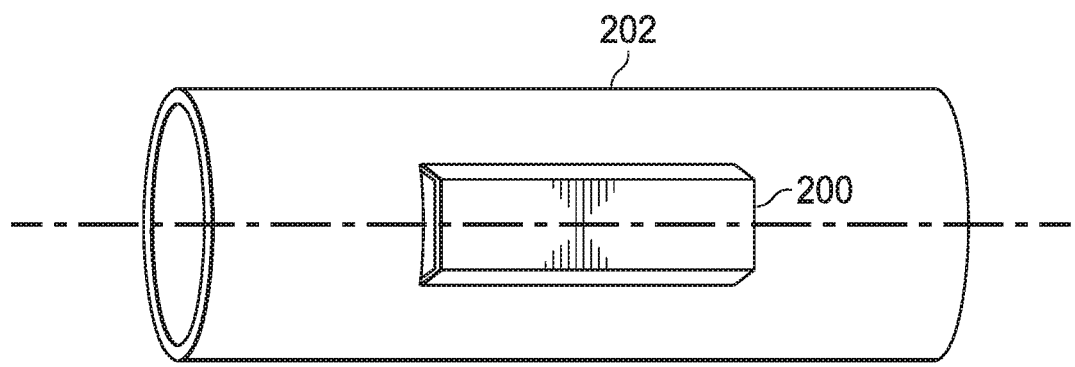
FIG. 2 is an example LCFDS that is affixed to a tubular, according to some implementations of the present disclosure.
Figure 3:
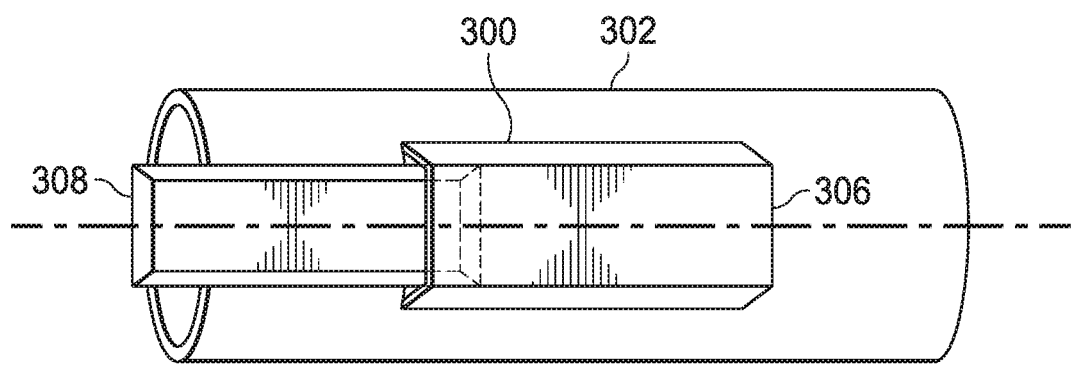
FIG. 3 is another example LCFDS in which a housing of an LCFDS is affixed to a tubular, while a reminder of the LCFDS forms a unit that is insertable into and removable from the affixed housing, according to some implementations of the present disclosure.

FIG. 2 shows an example LCFDS 200 that is affixed to a tubular 202. FIG. 3, on the other hand, shows a modular implementation in which a housing 306 of a LCFDS 300 is affixed to a tubular 302, while a reminder of the LCFDS 300 forms a unit 308 that is insertable into and removable from the affixed housing 306. The modular LCFDS 300 provides for rapid replacement of an LCFDS, which may reduce an amount of time that a tubular is out of service.

The size and shape of an LCFDS may be selected to be any desired size and shape. Further, any orientation of an LCFDS relative to a tubular may also be selected. For example, a length of an LCFDS, an angular orientation of an LCFDS relative to a longitudinal axis of a tubular, such as the longitudinal axes 201 and 301 (shown in FIGS. 2 and 3, respectively), a height or amount by which an LCFDS extends from an exterior surface of a tubular, or a spacing between adjacent LCFDSs may be selected to be any desired value. For example, a size and configuration of an LCFDS may be selected to fit a particular well application, such as in the case of a close-tolerance annulus formed between a wellbore and a tubular.

Figure 4:
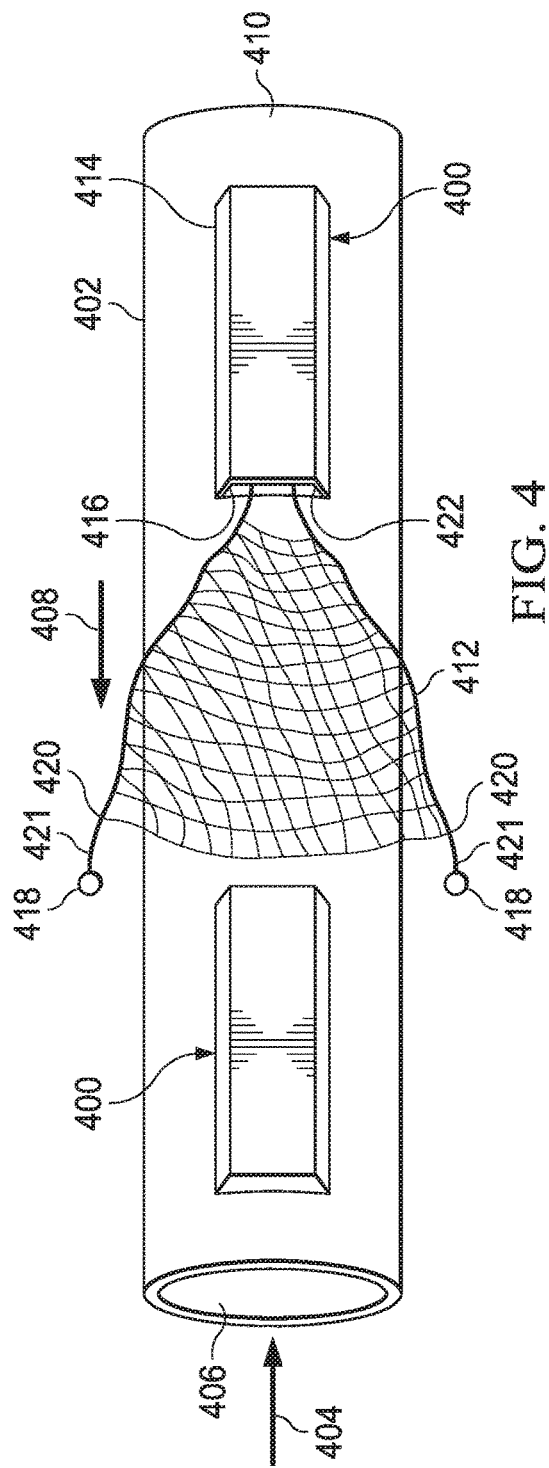
FIG. 4 is another example LCFDS, according to some implementation of the present disclosure.

In some implementations, a plurality of LCFDSs may be arranged along a length of a tubular, as shown, for example, in FIG. 4. Although FIG. 4 shows two LCFDSs 400, any number of LCFDSs may be disposed on a tubular linear offset from each other along a longitudinal axis of the tubular. Although FIG. 4 shows the longitudinally offset LCFDSs 400 aligned with each other, the scope of the disclosure is not so limited. Rather, LCFDSs may be longitudinally offset and angularly offset from each other relative to the longitudinal axis. Moreover, in still other implementations, different groupings of circumferentially arranged LCFDSs may longitudinally offset from each other along a length of a tubular. Still further, any desired number of LCFDSs may be provided on a tubular in any desired arrangement.

Returning to FIG. 1, in operation, the controller 120 receives data from the one or more sensors 118 and uses the received data to identify wellbore conditions. In some implementations, the sensors 118 continuously measure, calculate, and identify conditions within the wellbore. In other implementations, the sensors 118 may selectively take measurements over selected time periods or on the occurrence of one or more selected events. The determined wellbore conditions may be used to identify and locate lost circulation zones. In some implementations, the sensors 118 may include an accelerometer, a gyroscope, a magnetometer, a pressure sensor, a flow meter, a temperature sensor, or a combination of these sensors. Still further, other types of sensors may be included. In some implementations, an accelerometer, a gyroscope, and a magnetometer may form an inertial sensing system operable to detect motion and orientation of the LCFDS 100. In some implementations, a temperature sensor, a pressure sensor, and a flow meter may be used to identify and locate lost circulation zones.

When a lost circulation zone is detected, the controller 120 causes the release system 116 to release the LCF 114 from the housing 102. Particularly, the release system 116 actuates to open the door 112 to form the opening 108. The LCF 114 is then released into an annular space between the tubular 104 and an inner wall of a wellbore via the opening 108. In some implementations, the release system 116 includes an actuator 126 and a linkage 128 that connects the door 112 to the actuator 126. In some implementations, the actuator 126 may include a motor. In some implementations, the actuator 126 may be a low power linear actuator, for example a downhole linear solenoid actuator. However, the scope is not so limited. Rather, the actuator may be any device, component, or apparatus operable to deploy an LCF from an LCFDS. Different release systems are described later in the context of different LCFDS implementations. In the illustrated example of FIG. 1, when the controller 120 causes the release system 116 to operate (whether autonomously or by remote control), the actuator 126 rotates, causing the linkage 128 to pivot the door 112 about a hinged connection 130, thereby exposing the opening 108. The LCF 114 is deployed from the housing 102 via the opening 108.

The deployed LCF 114 may be released from the LCFDS 100 when the LCF 114 is in a desired position relative to a lost circulation zone. The deployed LCF 114 is separated from the LCFDS 100 by the separation system 117. In some implementations, the separation system 117 is controlled by the controller 120 to separate the LCF 114 at a desired time or upon a detection of a predetermined event, such as detection of a selected force applied by the LCF 114. In other implementations, the separation system 117 may be a passive system. For example, the separation system 117 may release the LCF 114 when a force applied to the separation system 117 by the LCF 114 exceeds a predetermined value. In such implementations, the separation system 117 may be one or more pegs received into corresponding apertures formed within the housing 102. The apertures may retain the pegs until a predetermined force applied to the pegs causes removal of the pegs from the apertures.

It is noted that detection of a lost circulation zone may be determined by the controller 120 based on inputs received from the one or more sensors 118. Further, determination of a lost circulation zone by the controller 120 may cause the controller 120 to release the LCF 114 autonomously. In other implementations, whether detection of a lost circulation zone is detected by the controller 120 or determined remotely, actuation of the release system 116 and deployment of the LCF 114 may be performed remotely, such as by a user or by a separate, remotely-positioned controller.

FIGS. 4-7 illustrate an example LCFDS 400. FIG. 4 is a perspective view of the LCFDSs 400 arranged on a tubular 402, and FIGS. 5-7 are views along a longitudinal axis of the tubular 402 carrying LCFDSs 400 and located within a wellbore. FIGS. 5-7 illustrate different points in time associated with deployment of LCFs.

Referring to FIG. 4, LCFDSs 400 are provided on a tubular 402. A mud flow 404 (identified by an arrow indicating a direction of flow) is shown passing downhole through a passage 406 of the tubular 402, and a returning mud flow 408 (identified by an arrow indicating a direction of flow) is shown flowing uphole along an exterior surface 410 of the tubular 402. As shown, an LCF 412 is released from a housing 414 of one of the LCFDSs 400 through an opening 416. The LCFDS 400 may include a door, which may be similar to the door 112 described earlier, and the door may be opened using a release system, which may be similar to the release system 116 described earlier. The LCF 412 is deployed through an opening 416 of the housing 414.

The LCF 412 includes a pair of floats 418 attached at opposing ends 420 of the LCF 412. In some implementations, the floats 418 may be attached using a connector 421. In some implementations, the connector 421 may be, for example, a cable, string, line, or cord. The floats 418 operate to remove and unfurl the LCF 412 during deployment. Although the LCF 412 is shown has having a pair of floats 418, other implementations may include additional floats or a single float. Further, in other implementations, the floats 418 may be arranged on the LCF 412 in other orientations, quantities, and configurations. The floats 418 may be less dense than the circulating mud in the returning mud flow 408. The floats 418 are typically made of a material having a mass density less than the mass density of the mud and can have good mechanical strength and thermal stability. For example, the floats 418 can be made of a polymer material or a metal foam. The reduced mass density of the floats 418 along with the direction of the mud flow 408 result in removal of the LCF 412 from a cavity 422 formed within the housing 414. With the LCF 412 deployed, the LCF 412 is ready to be applied over a portion of an interior surface of a wellbore where a lost circulation zone is present. The deployed LCF 412 may be directed to the lost circulation zone by the mud flow 408, since all or a portion of the mud flow 408 is being directed into and lost within the lost circulation zone.

FIG. 5 shows a tubular 500 having four LCFDSs 502 arranged about a circumference of the tubular 500. The LCFDSs 502 may be similar to the LCFDSs 400. As explained earlier, adjacent LCFDSs 502 are angularly offset by approximately 90° about the longitudinal axis 504 of the tubular 500. The tubular 500 is disposed in a wellbore 506 at or near a lost circulation zone 508 formed by a plurality of fractures 510. The LCFDSs 502 are in a pre-deployment configuration such that an LCF of the LCFDSs 502 are folded and stored within a housing. In FIG. 6, the LCF 512 has been deployed from each of LCFDSs 502. The LCFs 512 may be deployed in a manner as described in the present disclosure. Floats 514 on each of the LCFs 512 operate to release or assist in releasing the LCFs 512 from the housing of the associated LCFDS 502. A mud flow passing uphole through an annulus 516 formed between the wellbore 506 and tubular 500 may also assist in deploying the LCFs 512 from the LCFDSs 502. As a result, each of the LCFs 512 may be used to cover a quadrant or almost a quadrant of a circumference of the wellbore 506. FIG. 7 shows the LCFs 512 completely separated from the respective LCFDSs 502 and fully engaged with the circumference of the wellbore 506 at the lost circulation zone 508. Differential pressure around a lost circulation zone resulting from mud flow from the annulus 516 and into the lost circulation zone 508 operates to press the LCFs 512 against the circumference of the wellbore 506. The installed LCFs 512 form a seal to reduce or prevent mud loss into the lost circulation zone 508. Further, surface roughness of the LCF 512 generates friction with the wellbore 506 to retain the LCF 512 in position at the lost circulation zone 508. The LCF 512 and the nature of the deployment of the LCF 512 operates to reduce or eliminate forces applied to, and interactions with, a subterranean formation, thereby reducing or eliminating a risk of damaging the subterranean formation.

Figure 8:
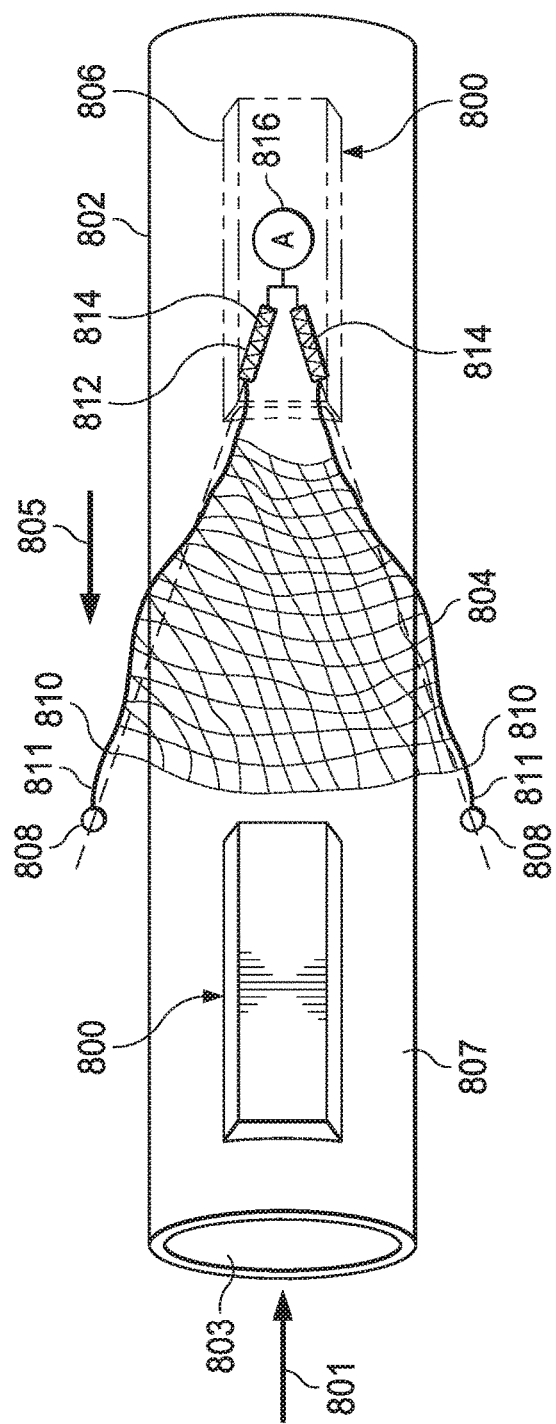
FIG. 8 is a perspective view of another example LCFDS that includes a launch system for forcefully ejecting a lost circulation fabric (LCF), according to some implementations of the present disclosure.

FIG. 8 is a perspective view of another example LCFDS 800. FIG. 8 shows a pair of LCFDSs 800 provided on an exterior surface 807 of a tubular 802 with one of the LCFDSs 800 having a deployed LCF 804. A mud flow 801 is shown flowing downhole through a passage 803 formed within the tubular 802. A returning mud flow 805 is shown flowing uphole along the exterior surface 807 of the tubular 802. The LCFDS 800 may be similar to the LCFDS 100 except as described, and the LCF 804 may be deployed as described earlier. For example, one or more features of the LCFDS 800 may be controlled by a controller, which may be similar to controller 120. Additionally, the LCF 804 may be deployed autonomously by the controller or in response to a remotely received command. When deployment is desired, a release system, which may be similar to release system 116, may open a door to form an opening within housing 806. The LCF 804 includes floats 808 arranged at ends 810 of the LCF 804. In some implementations, the floats 808 may be attached via a connector 811. In some implementations, the connector 81 may be, for example, a cable, string, line, or cord. The floats 808 may be similar to floats 418, described earlier, and the floats 808 operate, at least in part, to deploy and unfurl the LCF 804 from the housing 806 of the LCFDS 800.

In addition, the LCFDS 800 also includes a launch system 812. The launch system 812 operates to forcefully eject the LCF 804 from the housing 806. The launch system 812 operates to eject the LCF 804 in a desired direction and, in combination with the floats 808, unfold and unfurl the LCF 804. In some instances, the launch system 812 may form part of the release system. In other implementations, the launch system 812 may be a separate system that is in communication with a controller of the LCFDS 800, which may be similar to controller 120 described earlier.

In the illustrated example of FIG. 8, the launch system 812 includes a pair of springs 814 that are maintained in a compressed configuration when the LCF 804 is stored within the housing 806 (that is, prior to deployment of the LCF 804). The springs 814 may be angularly offset from each other such that the springs 814 direct the ends 810 of LCF 804 out from the housing 806 and away from each other in order to unfold and unfurl the LCF 804 when the LCF 804 is deployed. During deployment, the floats 808 and LCF 804 are forcefully ejected by releasing the compressed configuration of the springs 814, thereby converting the stored potential energy of the springs 814 into kinetic energy of the LCF 804. An actuator 816 may release the springs 814 from a compressed configuration, allowing the springs 814 to expand. As explained earlier, deployment may be performed autonomously by the LCFDS 800 or remotely. The mud flow 805 traveling uphole around the tubular 802 may assist in deploying the LCF 804. Once deployed, the LCF 804 may be released from the LCFDS 800 and drawn into contact with a lost circulation zone along a wellbore. Fluid pressure associated with the returning mud flow 805 as all or a portion of the mud flow 805 flows into the lost circulation zone, as described earlier, presses the LCF 804 against the wall of the wellbore.

Figure 9:
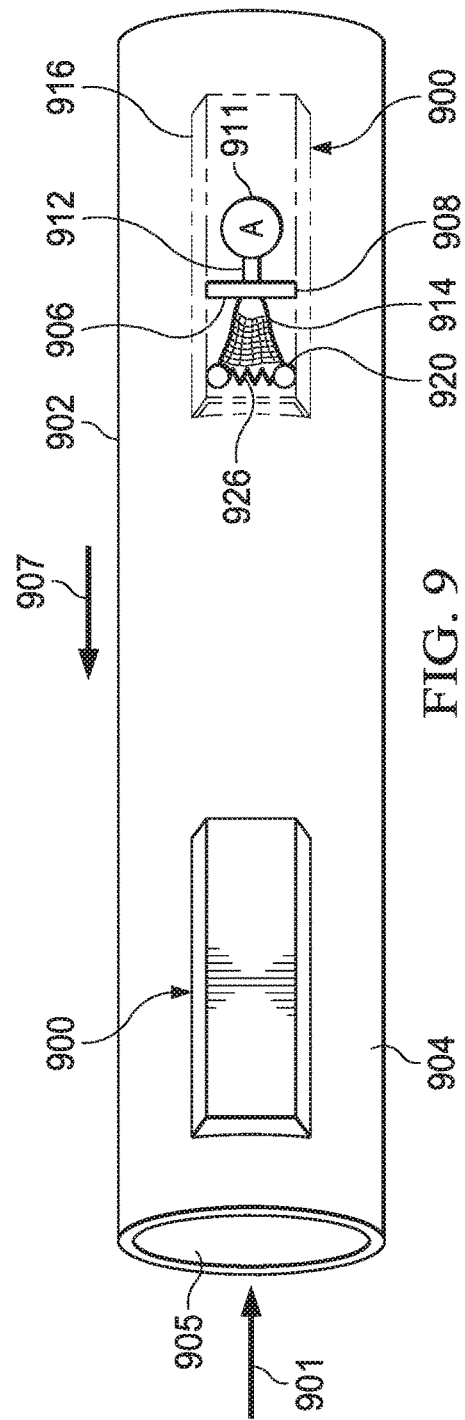
FIGS. 9 and 10 are side views of another example LCFDS that includes a launch system for forcefully ejecting an LCF, according to some implementations of the present disclosure.
Figure 10:
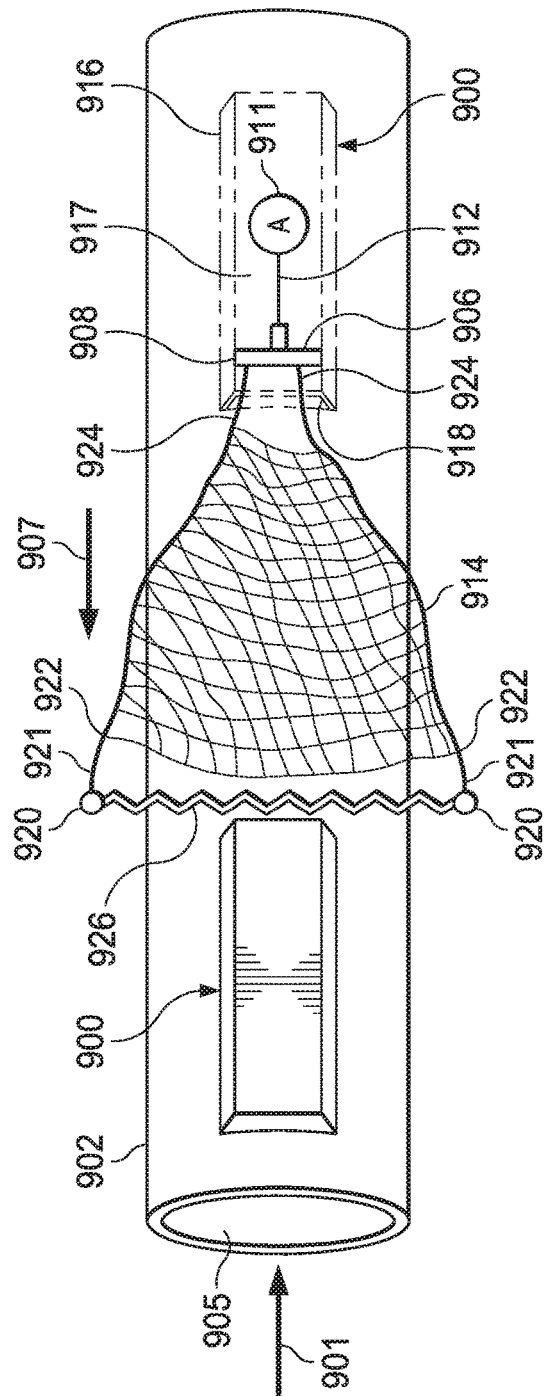

FIGS. 9 and 10 show another example LCFDS 900 that includes a launch system for forcefully ejecting an LCF during deployment. The LCFDS 900 may be similar to the LCFDS 100 except as described. One or more features of the LCFDS 900 may be controlled by a controller, which may be similar to controller 120. In other implementations, one or more features of the LCFDS 900 may be controlled remotely. For example, the LCFDS 900 may be operated in response to a remotely received command or autonomously by a controller within the LCFDS 900. When deployment is desired, a release system, which may be similar to release system 116, may open a door to form an opening within housing 916.

FIG. 9 shows a tubular 902 that includes two LCFDSs 900 on an exterior surface 904 of the tubular 902. A fluid flow 901 passes through a passage 905 formed within the tubular 902, and a returning fluid flow 907 passes along the exterior surface 904 of the tubular 902. The LCFDS 900 includes a launch system 906 and may otherwise be similar to the LCFDS 100 described earlier. In some implementations, the launch system 906 may be a separate system within the LCFDS 900, while, in other implementations, the launch system 906 may form part of a release system similar to the release system 116, described earlier. The launch system 906 includes a movable platform 908 that is coupled to an actuator 911 by a rod 912.

During deployment, an opening 918 to the housing 916 may be opened, as described earlier, and the actuator 911 of launch system 906 displaces the platform 908 towards the opening 918 via the rod 912. In some implementations, the actuator 911 may be a linear actuator or motor. In some implementations, the launch system 906 rapidly displaces the platform 908 towards the opening 918. Displacement of the platform 908 towards the opening 918 ejects an LCF 914 from a cavity 917 formed within the housing 916. The ejection by the launch system 906 and floats 920 coupled to ends 922 of the LCF 914 promote the unfolding and unfurling of the LCF 914. In some implementations, ejection of the LCF 914 causes rapid unfolding and unfurling of the LCF 914. The floats 920 may be similar to floats 418, described earlier, and, in some implementations, the floats 920 may be attached using a connector 921. In some implementations, the connector 921 may be a cable, string, line, cord, or other type of connector. The LCF 914 may be coupled to the platform 908 at one or more ends 924. A separation system, which may be similar to separation system 117 described earlier, may be included on the platform 908 and be operable to release the LCF 914 at a desired time or upon an occurrence of a predetermined event, such as the elapse of a selected period of time or application of a force to the LCF 914 that meets or exceeds a predetermined amount. In some implementations, the launch system 906 may form part of the release system. In other implementations, the release system and the launch system 906 may be separate systems.

The LCF 914 also includes a spring 926 that extends between the ends 922 of the LCF 914. As shown in FIG. 9, the LCFDS 900 is in a pre-deployment configuration such that the LCF 914 is folded and stored within the housing 916 of the LCFDS 900. In the pre-deployment configuration, the spring 926 is compressed. FIG. 10 shows the LCF 914 deployed from the LCFDS 900. When the LCF 914 is released form the housing 916, the spring 926 expands to separate the ends 922 and the floats 920 of the LCF 914, resulting in spreading of the LCF 914. Thus, the spring 926 operates to assist in the rapid deployment of the LCF 914. Upon release, the LCF 914 is ready to be positioned over a portion of a wellbore defining a lost circulation zone.

Figure 11:
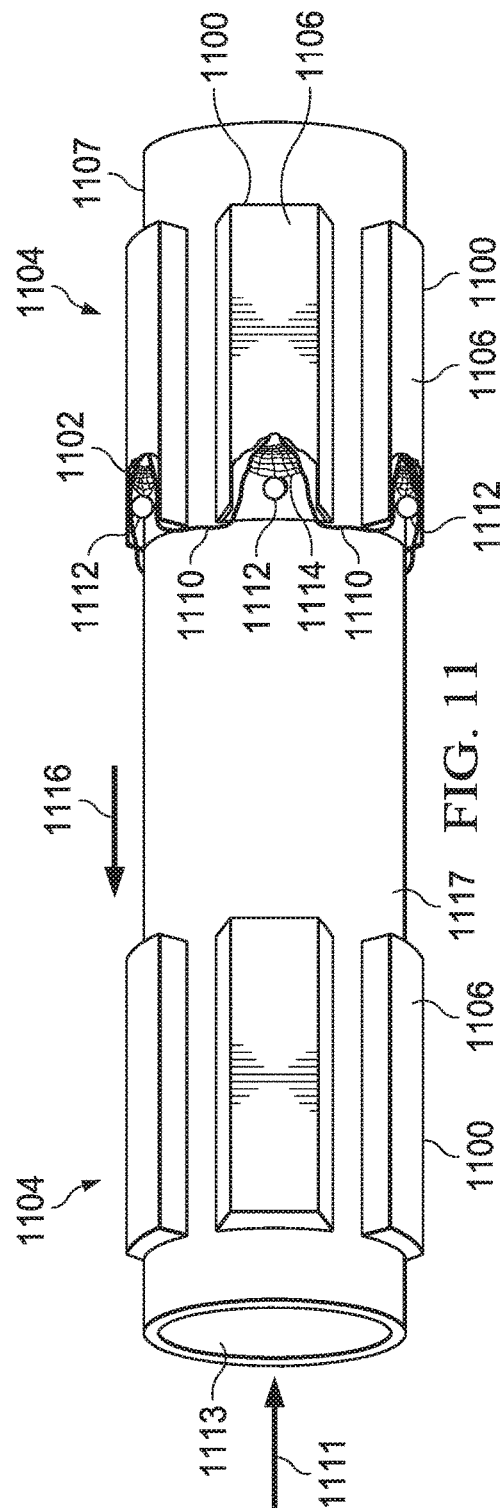
FIGS. 11 and 12 are side views of a plurality of LCFDSs arranged about a circumference of a tubular in which LCFs of adjacent LCFDSs are coupled together, according to some implementations of the present disclosure.
Figure 12:
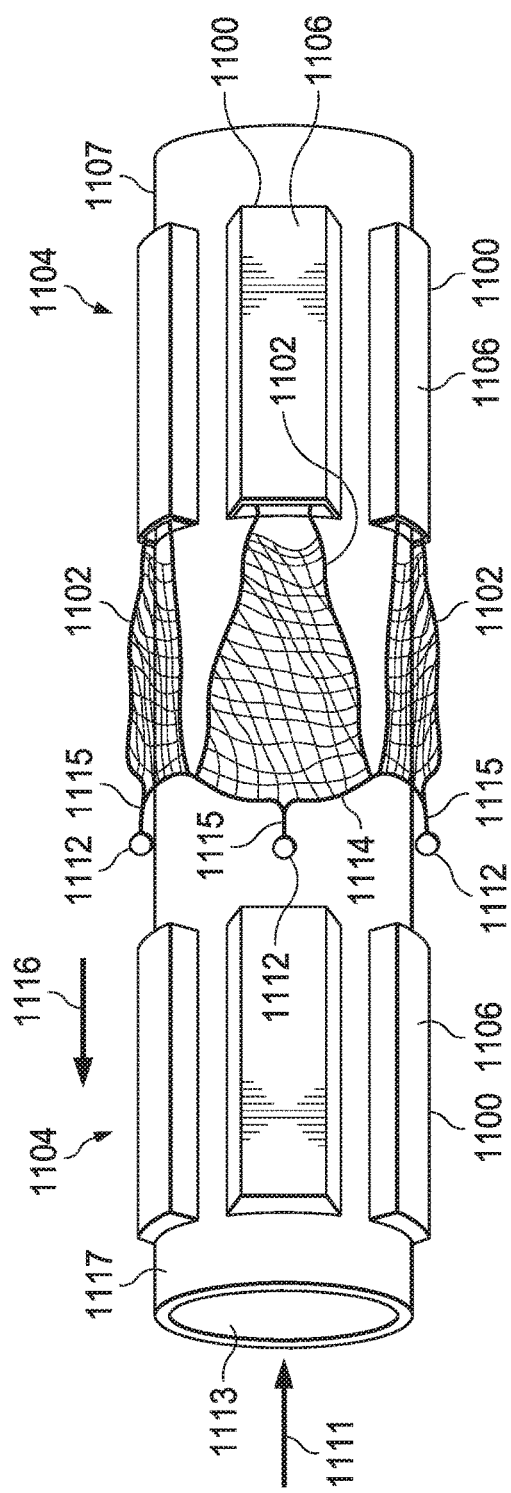

FIGS. 11 and 12 show another example LCFDS 1100 in which LCFs 1102 of adjacent LCFDSs 1100 are connected such that the LCFDSs 1100 define a composite loss circulation fabric system 1104. The LCFDS 1100 may be similar to the LCFDS 100 except as described. In some implementations, a plurality of LCFDSs 1100 may be arranged so as to encircle an entire circumference of a tubular 1107. In such implementations, the released LCFs 1102 form a unitary annular ring about the tubular 1107. In other implementations, the system 1104 may extend about the tubular 1107 less than the entire circumference. Thus, upon release of the LCFs 1102, the coupled LCFs 1102 may not encircle an entire circumference of the tubular 1107. More than one system 1104 may be provided along the tubular 1107 at one or more circumferential locations, either entirely encircling the tubular or extending less than an entire circumference. FIGS. 11 and 12 show two systems 1104 that extend about a circumference of the tubular 1107 at separate locations. A mud flow 1111 is shown flowing downhole through a passage 1113 formed within the tubular 1107. A returning mud flow 1116 is shown flowing uphole along the exterior surface 1117 of the tubular 1107.

One or more features of the LCFDS 1100 may be controlled by a controller, which may be similar to controller 120. In other implementations, one or more features of the LCFDS 1100 may be controlled remotely. For example, the LCFDS 1100 may be operated in response to a remotely received command or autonomously by a controller within the LCFDS 1100. When deployment is desired, a release system, which may be similar to release system 116, may open a door to form an opening within housing 1106. In some implementations, the LCFDS 1100 may also include a launch system similar to the launch system 812 or launch system 906, described earlier. In some implementations, the launch system may form part of a release system similar to release system 116, described earlier.

FIG. 11 shows the LCFDSs 1100 is a pre-deployment configuration in which LCFs 1108 of each LCFDS 1100 is in a folded configuration and stored within respective housings 1106. Adjacent LCFs 1108 are connected using a connector 1110. In some implementations, the connector 1110 may be, for example, a cable, string, line, or cord. Additionally, each of the LCFs 1108 includes a float 1112. In some implementations, the float 1112 is centrally located along a length of edge 1114 of the LCF 1108, which is shown in more detail in FIG. 12. The float 1112 may be coupled to the edge 1114 using a connector 1115. In some implementations, the connector 1115 may be, for example, a cable, string, line, or cord. The floats 1112 may be similar to float 418, described earlier. In other implementations, the floats 1112 may have a different arrangement. For example, in some implementations, each edge 1114 of the LCF 1108 may include a plurality of floats 1112.

According to some implementations, the LCFDSs 1100 of the system 1104 release the LCFs 1102 simultaneously. In other implementations, one or more of the LCFs 1102 may be released at different times. For the remainder of the description of system 1104, the LCFDSs 1100 are made to release the respective LCFs 1108 at the same time. Further, the LCFDSs 1100 of the system 1104 may be identical. In other implementations, one or more of the LCFDSs 1100 may be different from another of the LCFDSs 1100. For the remainder of this description of system 1104, the LCFDSs 1100 are described as being identical.

FIG. 12 shows one of the systems 1104 with the LCFs 1102 deployed while another of the systems 1104 remains in a non-deployed configuration. During deployment, one or more of the LCFs 1108 may be rapidly ejected by a launch system. In some implementations, the LCFs 1108 may be released without the assistance of a launch system. Upon release of the LCFs 1108, the floats 1112 interact with a mud flow 1116 and assist in removing the LCFs 1108 from the respective housings 1106. As the LCFs 1108 are released, the LCFs unfold and unfurl in preparation for being applied to a lost circulation zone. Additionally, the LCFDSs 1100 may also include a separation system as described earlier.

The separation system separates the deployed LCFs 1108 from the LCFDSs 1100 so that the LCFs 1108 may be directed into position at a lost circulation zone, such as by the portion of the fluid flow 1116 being drawn into a lost circulation zone.

Figure 13:
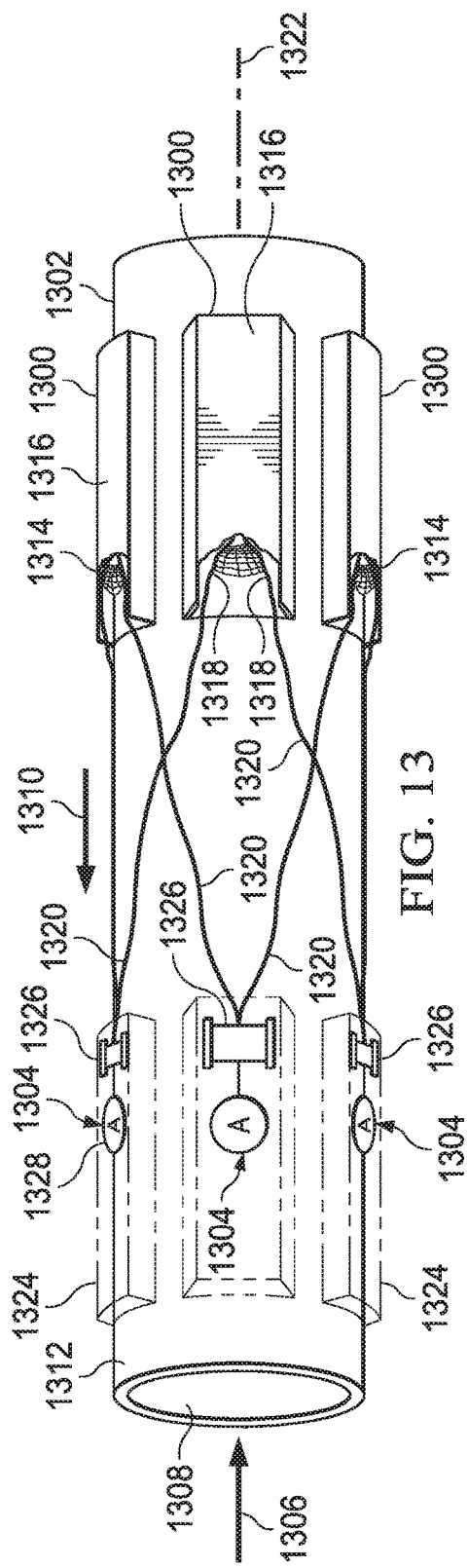

FIGS. 13 and 14 show another example LCFDS 1300. FIGS. 13 and 14 show a plurality of LCFDSs 1300 arranged about a circumference of a tubular 1302. The LCFDS 1300 may be similar to the LCFDS 100 except as described. In some implementations, a plurality of LCFDSs 1300 may be arranged so as to encircle an entire circumference of tubular 1302. In other implementations, a plurality of LCFDSs 1300 may be arranged to extend about the tubular 1302 less than the entire circumference. Circumferential arrangements of the LCFDSs 1300 may be provided at different locations along a longitudinal axis of the tubular 1302.

FIGS. 13 and 14 also show actuators 1304 arranged about a circumference of the tubular 1302 at a location longitudinally offset from the circumferential arrangement of LCFDSs 1300. A mud flow 1306 is shown flowing downhole through a passage 1308 formed within the tubular 1302. A returning mud flow 1310 is shown flowing uphole along the exterior surface 1312 of the tubular 1302.

An LCF 1314 is housed within a cavity 1315 formed within a housing 1316 of each of the LCFDSs 1300. The LCFDSs 1300 may include a door that is movable to cover and uncover the opening 1301 formed in the housing 1316. The door may be similar to the door 112 or any of the other doors described within or otherwise encompassed by the present disclosure. The LCFDSs 1300 may also include a release system to actuator the door between an open position and closed position to uncover and cover the opening 1301. The release system may be similar to the release system 116 or any other release system described in or otherwise encompassed by the present disclosure.

Ends 1318 of LCFs 1314 are coupled to one of the actuators 1304. A connector 1320 connects the end 1318 of the LCF 1314 to one of the actuators 1304. In some implementations, the connector 1320 may be, for example, a cable, string, line, or cord. Opposing ends 1318 of an LCF 1314 are coupled to different actuators 1304. Additionally, the ends 1318 of the LCFs 1300 are coupled to actuators 1304 that are angularly offset, relative to a longitudinal axis 1322, from the LCF 1314. As a result of this angular offset, as the actuators 1304 eject the LCFs 1314 from the housings 1316, the LCFs 1314 are unfolded and expand outwardly, as shown in FIG. 14. In the implementations illustrated, each actuator 1304 connects to two different LCFs 1314. In other implementations, there may be no angular offset.

As a result of the described arrangement between the LCFs 1314 and the actuators 1304, adjacent LCFs 1314 overlap each other upon deployment. The overlapping LCFs 1314 combine to form a continuous loss circulation fabric for application to a lost circulation zone. In some implementations, overlapping of adjacent LCFs 1314 occurs about an entire circumference of the tubular 1302. In other implementations, the overlapping of adjacent LCFs 1314 occurs over less than an entire circumference of the tubular 1302.

As shown in FIGS. 13 and 14, each of the actuators 1304 is contained within a housing 1324. In the illustrated example, the housings 1324 are longitudinally aligned with the housings 1316 of the LCFDSs 1300. In other implementations, the housings 1324 may not align longitudinally with the housings 1316.

In some implementations, the actuators 1304 may include a bobbin 1326 and a motor 1328. The connectors 1320 are coupled to the bobbins 1326 such that rotation of the bobbins 1326 by the motors 1328 causes the connectors 1320 to wind around the bobbins 1326 and, in the process, extract the LCFs 1314 from the housings 1316. The actuators 1304 may have other forms in other implementations. For example, the actuators 1304 may be similar to the actuator 911 in FIG. 10 where the actuator 911 drives a rod 912 that pushes the fabric out of the housing 916 using a launch system 906. Additionally, or alternatively, the actuators 1304 may be similar to the actuators 816, the actuators 1304, or the actuators 1514, or any of the actuators disclosed in the specification.

The LCFDSs 1300 may also include a separation system that may be similar to the separation systems described earlier. Thus, once deployed, the LCFs 1314 may be separated from the LCFs 1300 and directed into position by a portion of the mud flow 1310 that is directed into the lost circulation zone.

FIGS. 15A and 15B show another example LCFDS 1500. Two LCFDSs 1500 are shown longitudinally offset from each other along an axis 1522 of a tubular 1502. However, the LCFDSs 1500 may be arranged as described earlier. For example, in some implementations, a plurality of LCFDSs 1500 may be arranged so as to encircle an entire circumference of tubular 1502. In other implementations, a plurality of LCFDSs 1500 may extend about the tubular 1502 less than the entire circumference. Circumferential arrangements of the LCFDSs 1500 may be provided at different locations along an axis 1522 of the tubular 1502. The LCFDS 1500 may be similar to the LCFDS 100 except as described. A mud flow 1504 is shown flowing downhole through a passage 1506 formed within the tubular 1502. A returning mud flow 1508 is shown flowing uphole along the exterior surface 1510 of the tubular 1502

The LCFDS 1500 includes an LCF 1512, which his shown deployed in FIG. 15A. The LCFDS 1500 includes an actuator 1514 to extract the LCF 1512 from a housing 1516 of the LCFDS 1500. One of the actuators 1514 is coupled to each end 1518 of the LCF 1512. The actuators 1514 may be coupled to the ends 1518 via a connector 1520. In some implementations, the connector 1520 may be, for example, a cable, string, line, or cord. During deployment, the actuators 1514 extract the LCF 1512 from the housing 1516, unfold, and spread the LCF 1512. In some implementations, the actuators 1514 move in a diagonal along the surface 1510 relative to a longitudinal axis 1522 of the tubular 1502. However, in other implementations, the actuators 1514 may be move in any desired path along the surface 1510 of the tubular 1502.

The actuator 1514 travels along the surface 1510 of the tubular 1502. In some implementations, the actuator 1514 is a linear actuator. In other implementations, the actuator 1514 contains wheels such that it can roll along a surface 1502 of the tubular 1502. In some implementations, the actuator 1514 can be driven by a motor, such as a rotary motor, but in some implementations, the actuator 1514 may be ejected from the from the housing 1516. In some implementations, the wheels of the actuator 1514 may be made of a magnetic material or include magnetic material such that they can remain attached to an exterior surface of tubular 1502, which is typically ferromagnetic.

The LCFDS 1500 may also include a separation system that may be similar to the separation systems described earlier. Thus, once deployed, the LCF 1512 may be separated from the LCF 1512 and directed into position by a portion of the returning mud flow 1508 that is directed into the lost circulation zone.

Figure 16:
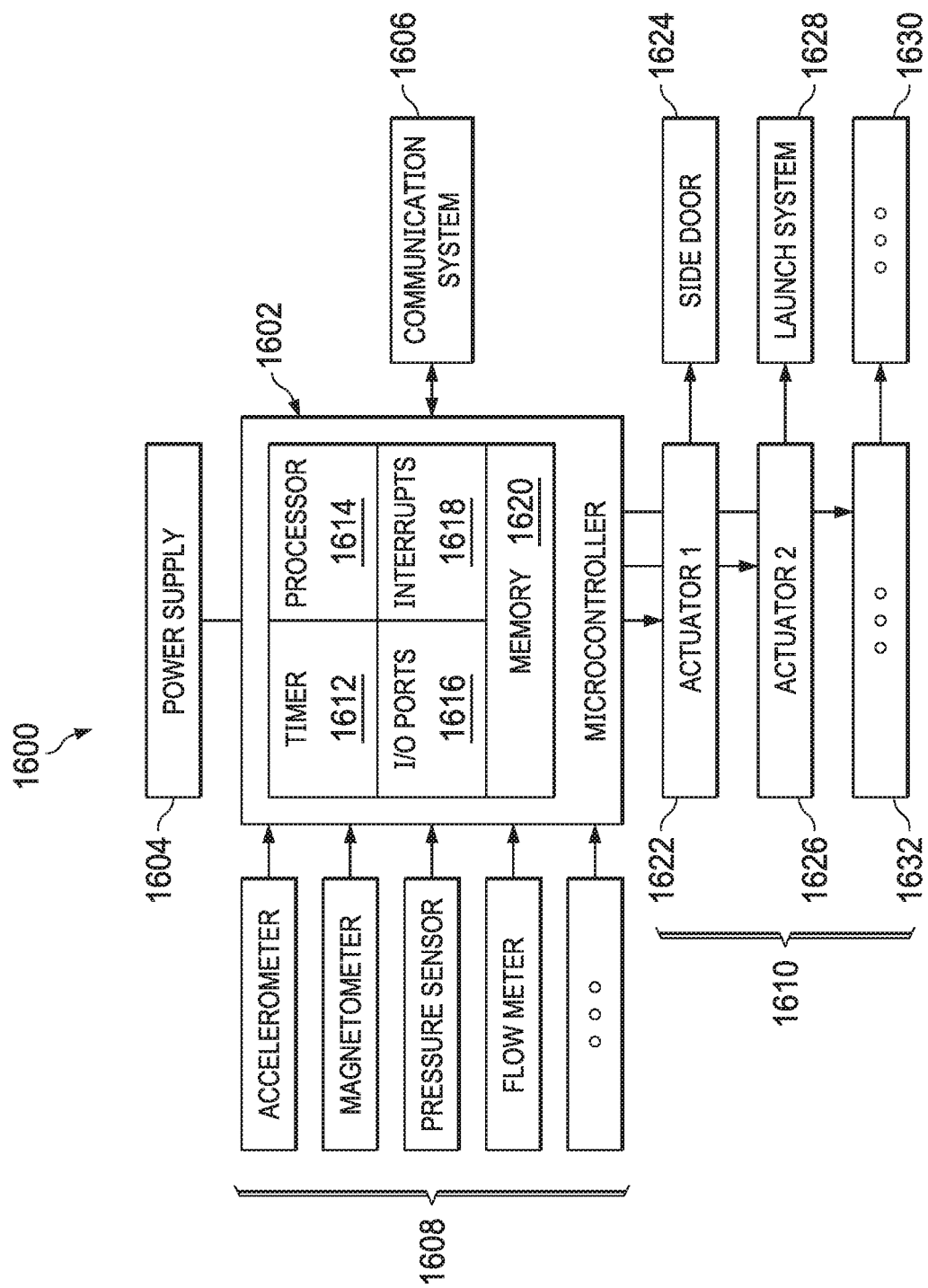
FIG. 16 is a schematic of an example electromechanical system for use with a lost circulation fabric deployment system, according to some implementations of the present disclosure.

FIG. 16 is a schematic of an example electromechanical system 1600 for use with a lost circulation fabric deployment system within the scope of the present disclosure. The system 1600 includes a controller 1602; a power supply 1604; a communications system 1606; one or more sensors 1608; and one or more actuators 1610. The power supply 1604 supplies electrical power to the controller 1602 and other components of the system 1600. In some implementations, the power supply 1604 may supply electrical power to other components of an LCFDS. In some implementations, the power supply 1604 may be a battery, a capacitor, or another device operable to store energy for later use.

The controller 1602 is communicably coupled to the communications system 1606, the one or more sensors, and the actuators. The controller 1602 receives information from the one or more of these components, transmits information to one or more of these components, or both. The controller 1602 is operable to control functions of the system 1600. For example, in some implementations, the controller 1602 is operable to determine a position and orientation within a wellbore, locate a lost circulation zone, and deploy a lost circulation fabric when the LCFDS is at a predetermined position relative to the lost circulation zone. The controller 1602 receives information form the one or more sensors and uses the received information from the sensors to operate an LCFDS to deploy an LCF. Example methods of operation of a controller, such as the controller 1602, are described in more detail.

The controller 1602 includes a timer 1612, a processor 1614, ports 1616 (which may include a charging port and a communications port similar to those described earlier), interrupts 1618, and memory 1620. The processor 1614 may be or include a computer, which is described in more detail later. The memory may be one or more different types of memory, which are also described in more detail later. The timer 1612 of the processor 1614 is for adding timestamps to measurements taken by the sensors. In this way, the processor 1614 is able to timestamp and record the downhole incidents through the sensing measurement. The timer is also used to create a time delay for triggering either the sensing command or the actuation command. The interrupts 1618 work as triggers that awaken the processor from power saving mode or triggers to execute certain commands such as sensing and actuation.

The communication system 1606 provides communication between the system 1600 and a remote location. For example, the communication system 1606 may provide communication between the system 1600 and a computer located at a surface of the earth. In some implementations, the one or more actuators 1610 includes a first actuator 1622 operable actuate a release system 1624 of the LCFDS; and a second actuator 1626 operable to actuate a launch system 1628. In some implementations, the release system 1624 may be similar to the release system described and encompassed within the present disclosure, such as release system 116. For example, a release system may include a system operable to open a door of an LCFDS to permit deployment of an LCF. The release system may include an actuator that operates to deploy an LCF from a housing. For example, an actuator such as a motor and a bobbin, which may be similar to motor 1328 and bobbin 1326, described earlier, to release and unfurl an LCF may form part of the release system. Another type of actuator may be an actuator similar to actuator 1514 that moves along an exterior surface of a tubular to extract an LCF from a housing to deploy the LCF.

However, the scope of the disclosure encompasses other types of actuators operable to deploy an LCF from an LCFDS.

The launch system 1628 may be similar to launch systems within the scope present disclosure, such as launch system 812 or launch system 906. Thus, the actuator 1626 associated with the launch system 1628 may include an actuator similar to actuator 911, spring 926, or both, described earlier. In some implementations, the actuator 1626 may be or include a spring, which may be similar to springs 814. In some implementations, the release system 1624 and the launch system 1628 may be part of a unitary system. Consequently, in some implementations, the first actuator 1622 and the second actuator 1626 may form part of a single system operable to release an LCF.

In other implementations, the system 1600 may include other actuators. For example, the system 1600 may include a third actuator 1630 operable to actuate a separation system 1632 within the scope of the present disclosure, such as separation system 117 described earlier. Although three actuators are described, the scope of the disclosure is not so limited. For example, additional or fewer actuators may be included. Further, the included actuators may form part of a unitary system or may be part of or be associated with separate respective systems to provide actuation for those separate systems.

The one or more sensor 1608 provide data to the controller 1602 to permit the controller 1602 to operate to deploy an LCF. For example, the one or more sensors 1608 may enable the controller 1602 to determine motion and orientation of an LCFDS and to detect a location of a lost circulation zone. The system 1600 may include sensors, such as, an accelerometer, a gyroscope, a magnetometer, a pressure sensor, a flow meter, a temperature sensor, or a combination of these sensors. In other implementations, the system 1600 may include fewer, additional, or different sensors than those described. As explained earlier, an accelerometer, a gyroscope, and a magnetometer may form an inertial sensing system operable to detect motion and orientation of the LCFDS. As also explained earlier, a temperature sensor, a pressure sensor, and a flow meter may be used to identify and locate lost circulation zones. Data obtained from these sensors is received by the processor 1614 and may be stored in memory 1620. The received information may be used when received, stored for use at a later time, transmitted to a remote location, or a combination of these. Information stored in memory 1620 may be stored and downloaded at a later time, such as upon return of the LCFDS to the surface.

In some implementations, the communication system 1606 may include software, hardware, or both to enable an LCFDS to communicate, such as over a wired or wireless connection. Further, the communication system 1606 may provide for real-time communication during drilling. For example, in some implementations, the communication system 1606 is operable to provide communication using mud-pulse telemetry or electromagnetically. In some implementations, a portion of data acquired during drilling is transmitted to a remote location, such as to the surface of the earth, while another portion of the acquired data is stored in memory 1620 of the system 1600. In other implementations, all of the acquired data may be stored in memory 1620 while all or a portion of the acquired data are transmitted in a delayed or real-time manner to a remote location. The stored data may be downloaded upon return of the LCFDS to the surface via communication port of ports 1616, which may be similar to the communication port described earlier with respect to FIG. 1.

Figure 17:
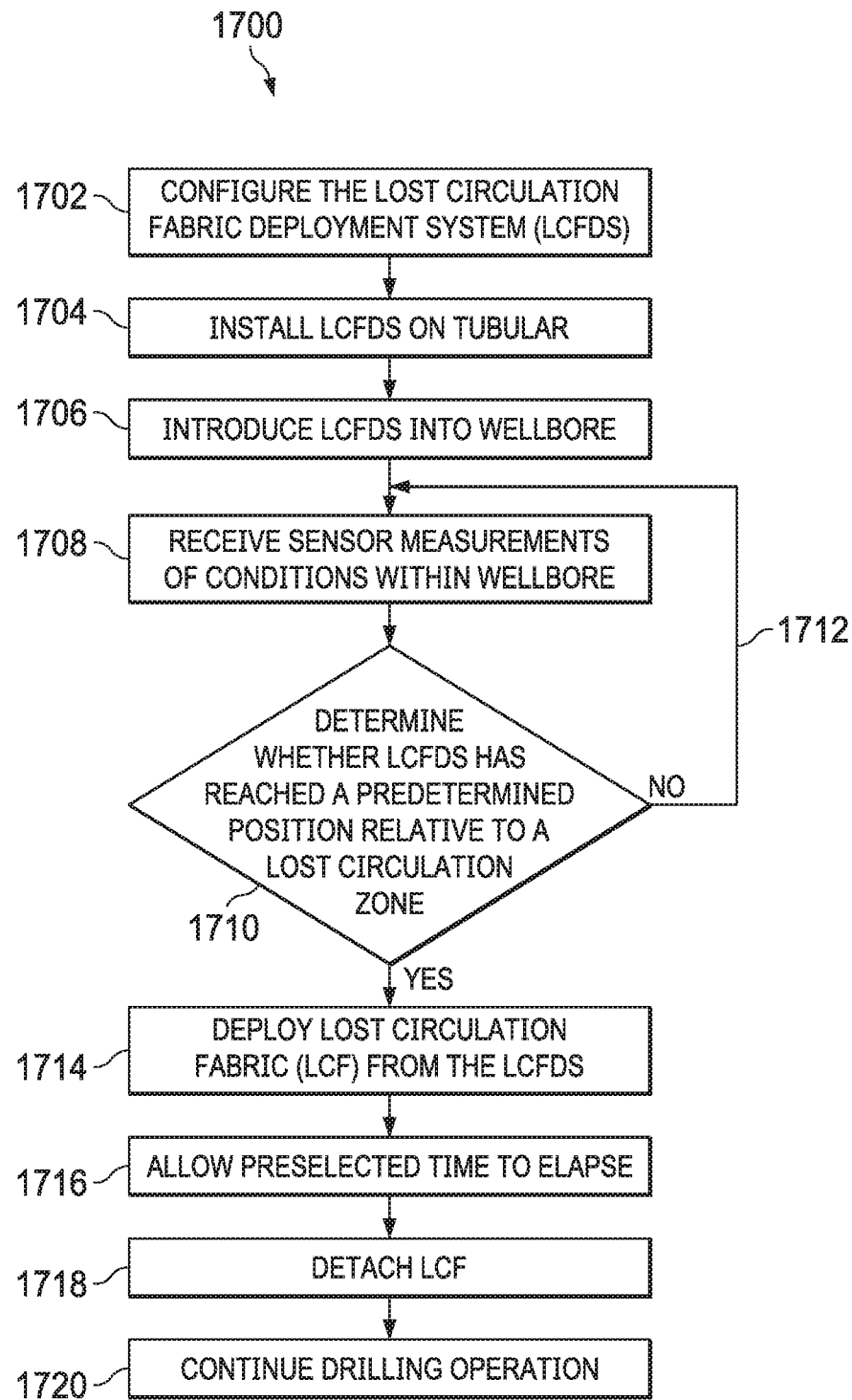
FIG. 17 is a flowchart of an example method for deploying an LCF, according to some implementations of the present disclosure.

FIG. 17 is a flowchart of an example method 1700 for deploying an LCF. Particularly, method 1700 is applicable to sealing one or more lost circulation zones located in a wellbore during a drilling operation. At 1702, an LCFDS is configured prior to being introduced into a wellbore during a drilling operation. The LCFDS may be any LCFDS as described earlier as well as others within the scope of the present disclosure. Although a single LCFDS is mentioned in the context of describing method 1700, it is understood that the steps of method 1700 may be applied to a plurality of LCFDSs. Configuration of the LCFDS may include installing information into the LCFDS, such as into a memory of the LCFDS. The information may include a profile of the wellbore, a predetermined zone depth, and wellbore conditions. The predetermined loss zone depth may be an estimated depth of the loss zone along a length of the wellbore. The wellbore conditions may be a wellbore profile such as a wellbore survey profile, a wellbore temperature versus depth profile, a wellbore pressure versus depth profile, and wellbore depth profile. Other types of information may be pre-installed into the LCFDS prior to being introduced into a wellbore during a drilling operation. For example, sensor measurements that may be interpreted as representing a loss circulation zone and a position and a preselected orientation of the LCFDS relative to a lost circulation zone prior to deployment of an LCF may also be installed into the LCFDS prior to being introduced into a wellbore during a drilling operation.

At 1704, the LCFDS is installed on a tubular, such as a drill pipe. The LCFDS may include a housing that is mounted to an exterior surface of the tubular. In some implementations, the housing is permanently fixed to the tubular. Thus, in some implementations, the LCFDS may be permanently attached to the tubular. In some implementations, the LCFDS may have a modular constructions such that the LCFDS forms a unit that is insertable and removable from the housing, as described earlier. In some implementations, the LCFDS may be positioned on the tubular near a bottom hole assembly. Further, where multiple LCFDSs are arranged on a tubular, such as about a circumference of the tubular, as described earlier, the LCFDSs are operable to stabilize the tubular within the wellbore, particularly during a drilling operation.

At 1706, the tubular is introduced into the wellbore. The tubular may be a length of drilling pipe. The tubular may include multiple LCFDSs. Further, in some implementations, multiple lengths of drilling pipes may be assembled. Consequently, in some implementations, multiple tubulars, each having multiple LCFDSs, are introduced into a wellbore.

At 1708, as the tubular or tubulars are being introduced into the wellbore, sensors included with the LCFDS take measurement of conditions within the wellbore, including position and orientation measurements of the LCFDS. The LCFDS, such as a controller of the LCFDS, utilizes the sensor measurements to determine a running depth of the LCFDS within the wellbore. Measurements that may be used to determine the running depth may include pressure, temperature, accelerometer, magnetometer, and gyroscope measurements. The controller may be similar to the controller 120 or any other controller within the scope of the present disclosure.

Some systems use sensors (for example, flow sensors and accelerometers) to identify when the LCFDS has reaches a lost circulation zone. Sensors of the LCFDS are used to determine a position of the LCFDS within the wellbore based on the running depth information, well profile data previously downloaded into the LCFDS, and other stored data. For example, the sensors can be used to determine when the LCFDS reaches a predetermined position in the wellbore relative to a lost circulation zone, as indicated at 1710. If the LCFDS has not reached a preselected position within the wellbore, the LCFDS continues to take measurements to detect when the LCFDS has reached the predetermined position within the wellbore, as indicated at 1712. If the predetermined position within the wellbore has been reached, then the LCFDS can deploy the LCF, as indicated at 1714, allow a preselected time to elapse, as indicated by 1716, and detach the LCF from the LCDFS, as indicated by 1718. The preselected time period allows for the full deployment of an LCF (such as complete removal from a housing of the LCFDS, complete unfolding and spreading) as well as to permit the LCF to be pressed against the wall of the wellbore at the lost circulation zone by the fluid pressure within the annulus between the wellbore and the drill string.

At 1720, a drilling operation is continued after deployment of the LCF. In some instances, the deployed LCF may not fully seal or isolate the lost circulation zone. Thus, in some instances, a spot treatment with lost circulation material (LCM) may be used to form an improved seal at the lost circulation zone. Spot treatment of a lost circulation zone with LCM is performed to maintain positive downhole pressure and allow for continued drilling.

As described earlier, a drilling string may include a plurality of LCFDSs. Each of the LCFDS may be deployed when the above-referenced criteria are satisfied. In other implementations, one or more of the LCFDSs may be linked to another LCFDSs such that, upon satisfaction of the criteria by one of the LCFDSs and deployment of an LCF from the one LCFDSs causes another or a plurality of other LCFDSs to deploy. In still other implementations, each LCFDS may operate autonomously such that each of the LCFDSs deploy the associated LCF when one or more deployment criterion are satisfied.

Figure 18A:
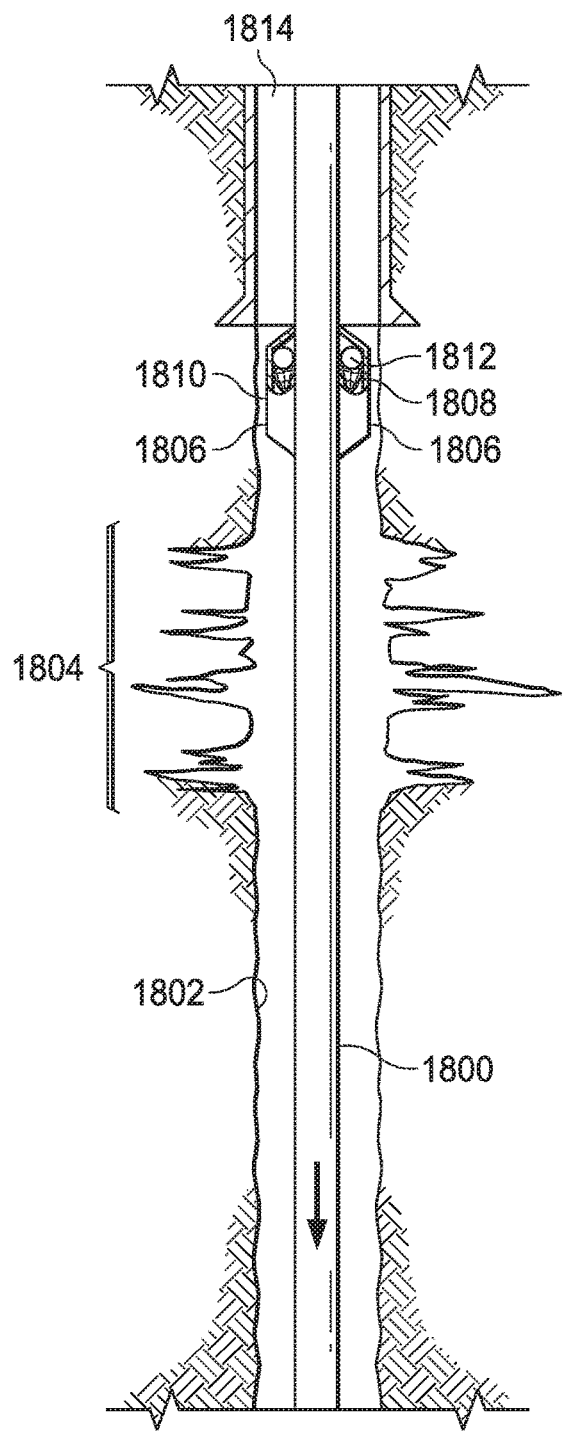
FIGS. 18A, 18B, and 18C are downhole images illustrating the deployment of an LCF or a plurality of LCFs from an LCFDS or a plurality of LCFDSs, respectively, according to some implementations of the present disclosure.
Figure 18B:
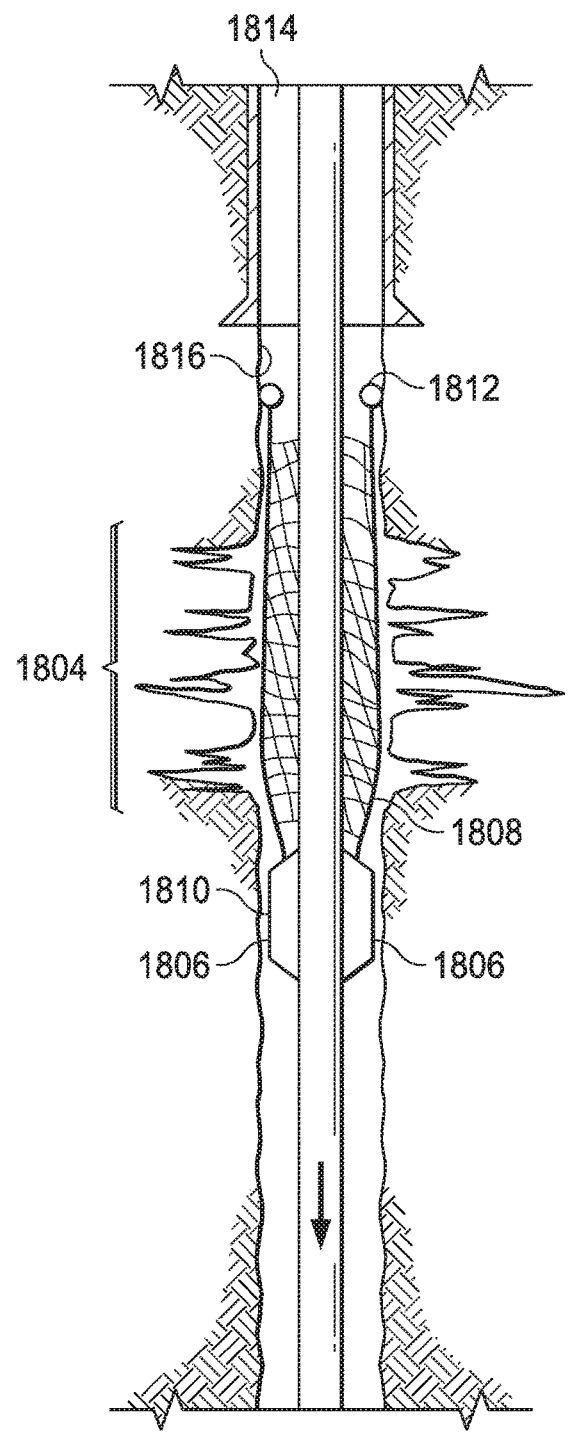
Figure 18C:
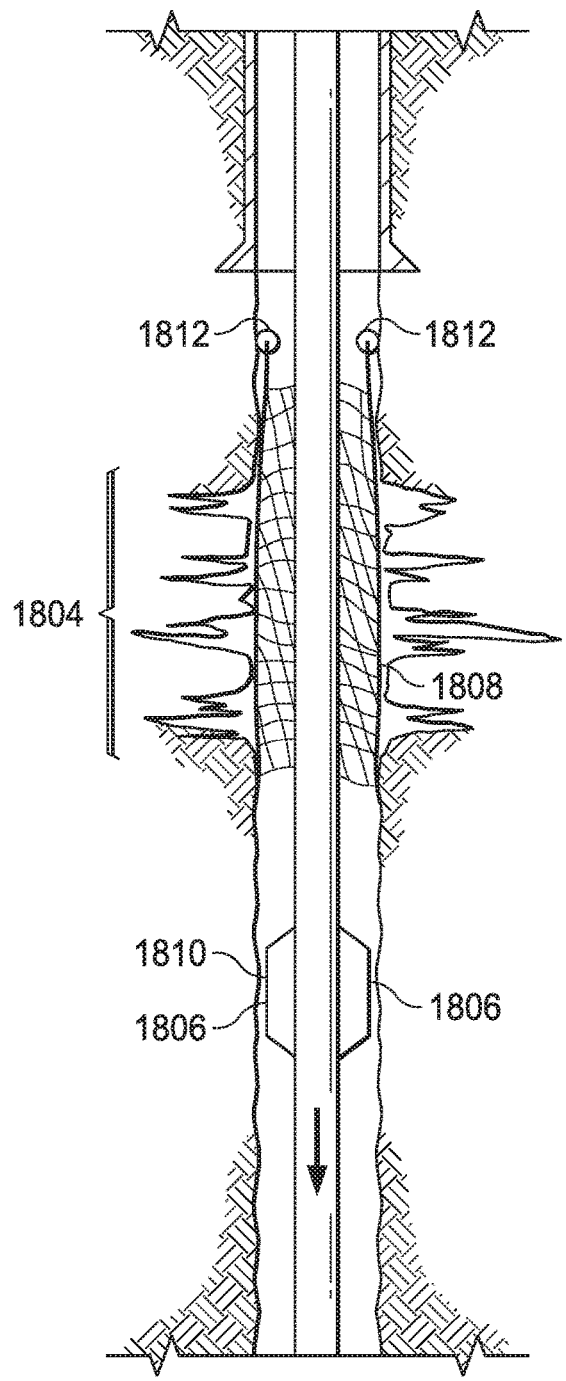

FIGS. 18A, 18B, and 18C are downhole images illustrating the deployment of an LCF or a plurality of LCFs from an LCFDS or a plurality of LCFDSs, respectively. Moreover, FIGS. 18A, 18B, and 18C illustrate deployment of an LCF from and LCFDS similar to the LCFDS 400, 800, 900, 1100, or 1500, described earlier. FIG. 18A shows a tubing string. For the purposes of the present description, the tubing string is described as a drilling string 1800, although it is to be understood that the tubing string may be another type of tubing string. The drilling string 1800 is disposed in a wellbore 1802. A lost circulation zone 1804 is present in the wellbore 1802. The drilling string 1800 includes pair of LCFDSs 1806. Although two LCFDSs 1806 are shown, additional or fewer LCFDSs may be included disposed on the drilling string 1800 about a common circumference or at different positions along the length of the drilling string 1800, or both. An LCF 1808 is stored in a housing 1810 of each LCFDS 1806. Each of the LCF 1808 includes one or more floats 1812 (which may be similar to floats 418, 808, 920, or 1112). However, in other implementations, the LCF 1808 may include one or more actuators, which may be similar to actuator 1514, in place of the floats 1812. The remainder of the description are made in the context of floats, although it is to be understood actuators similar to actuators 1514 may be used to deploy or assist in deploying the LCF 1808.

Referring to FIG. 18B, the drilling string 1800 is moved to a location downhole of the lost circulation zone 1804. As the LCFDSs 1806 reach a location proximate to the loss circulation zone 1804, onboard sensors of the LCFDSs 1806 operate to detect the presence of the lost circulation zone 1804. In the present implementation, when the LCFDSs 1806 detect the presence of the lost circulation zone 1804 and obtain a position downhole relative to the lost circulation zone 1804, as shown in FIG. 18B, the LCFDSs 1806 deploy the LCFs 1808. A period of time is permitted to elapse from the time of deployment of the LCFs 1808, which permits the LCFs 1808 to unfold and spread and be lifted uphole by a flow of drilling mud passing through annular space 1814. As the LCFs 1808 are lifted uphole, differential pressure at the lost circulation zone 1804 associated with drilling mud flowing into the lost circulation zone 1804, draws the LCFs 1808 against the wellbore surface 1816. As a result, the LCFs 1808 cover at least portions of the lost circulation zone 1804, forming a seal, thereby reducing or preventing the flow of drilling mud into the lost circulation zone 1804. Upon elapse of the period of time, the LCFs 1808 are separated from the associated LCFDSs 1806. With the LCFs 1808 in position and providing a barrier to lost circulation, the drilling string 1800 is continued to be moved downhole, as shown in FIG. 18C. In some instances, a spot treatment with LCM may be used to form a better seal at the lost circulation zone. Spot treatment of a lost circulation zone with LCM is performed to maintain positive downhole pressure and allow for continued drilling.

The process illustrated in FIGS. 18A, 18B, and 18C may be autonomously performed. Particularly, deployment of the LCFs 1808 may be autonomously deployed by a controller disposed within the LCFDSs 1806. In some implementations, the entirety of the process represented in FIGS. 18A, 18B, and 18C may be autonomously performed, including deployment of the LCFs 1808 and movement of the drilling string 1800 to place the LCFDSs 1806 in a predetermined position relative to the lost circulation zone 1804. For example, movement of drilling string 1800 may be autonomously controlled by a controller located, for example, at a surface of the earth. The controller located at the surface of the earth may be in communication with a controller contained with each of the LCFDSs 1806 to control deployment of the LCFs 1808.

Figure 19A:
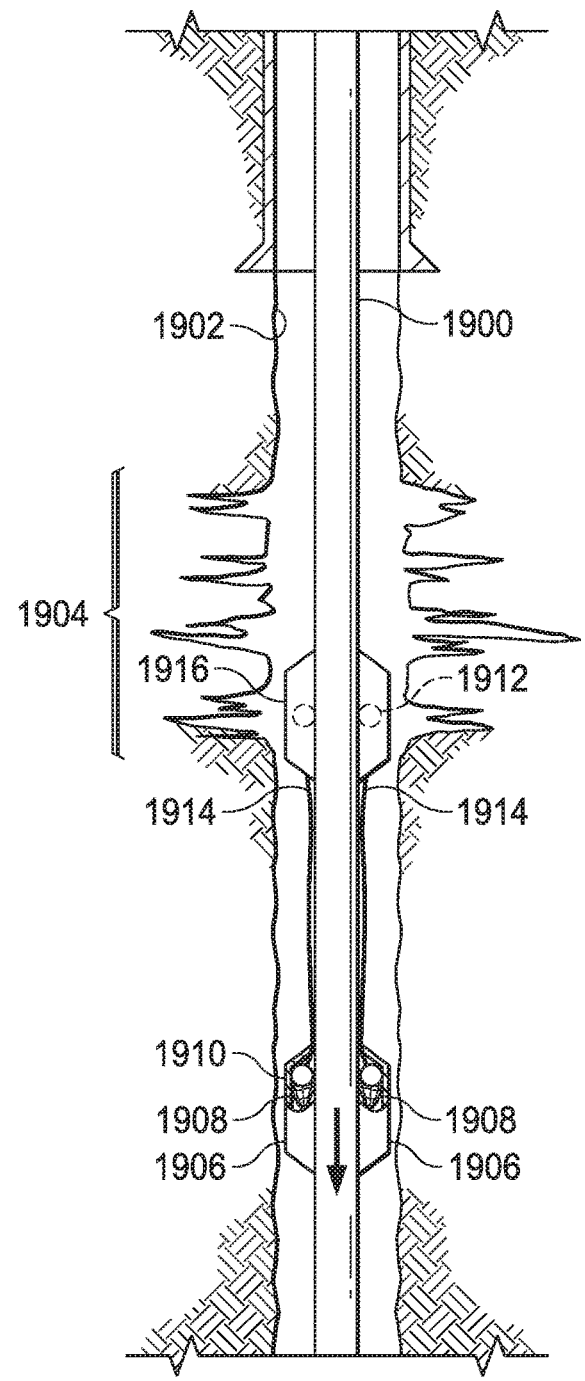
FIGS. 19A, 19B, and 19C are downhole images illustrating the deployment of an LCF or a plurality of LCFs from an LCFDS or a plurality of LCFDSs, respectively, according to some implementations of the present disclosure.
Figure 19B:
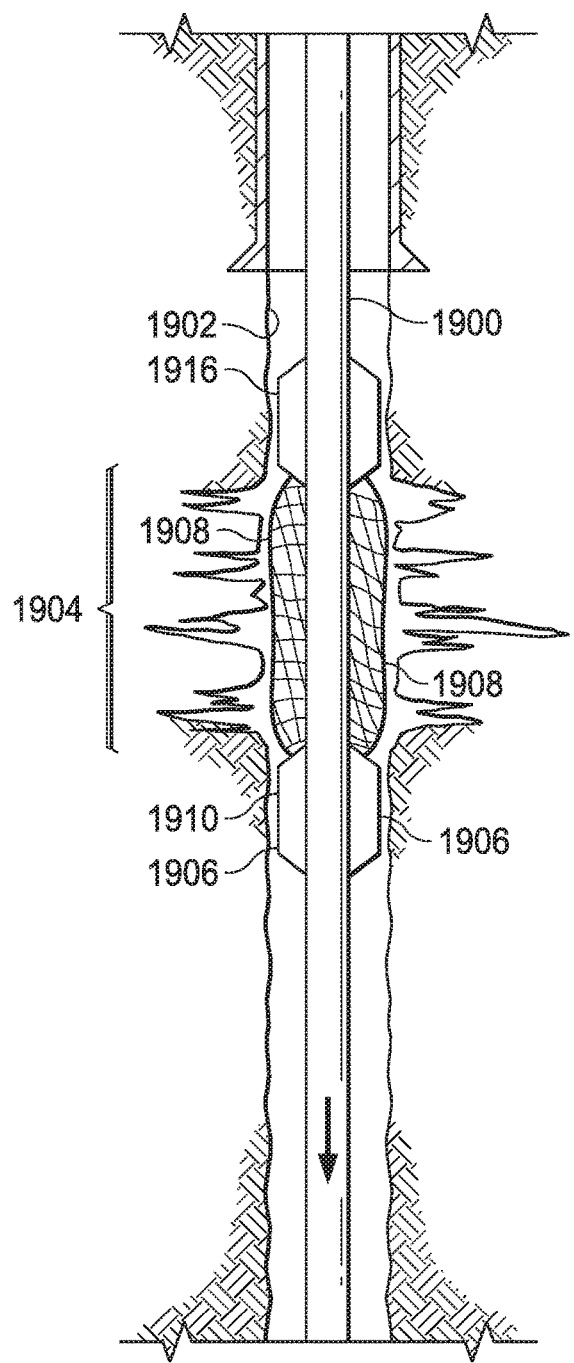
Figure 19C:
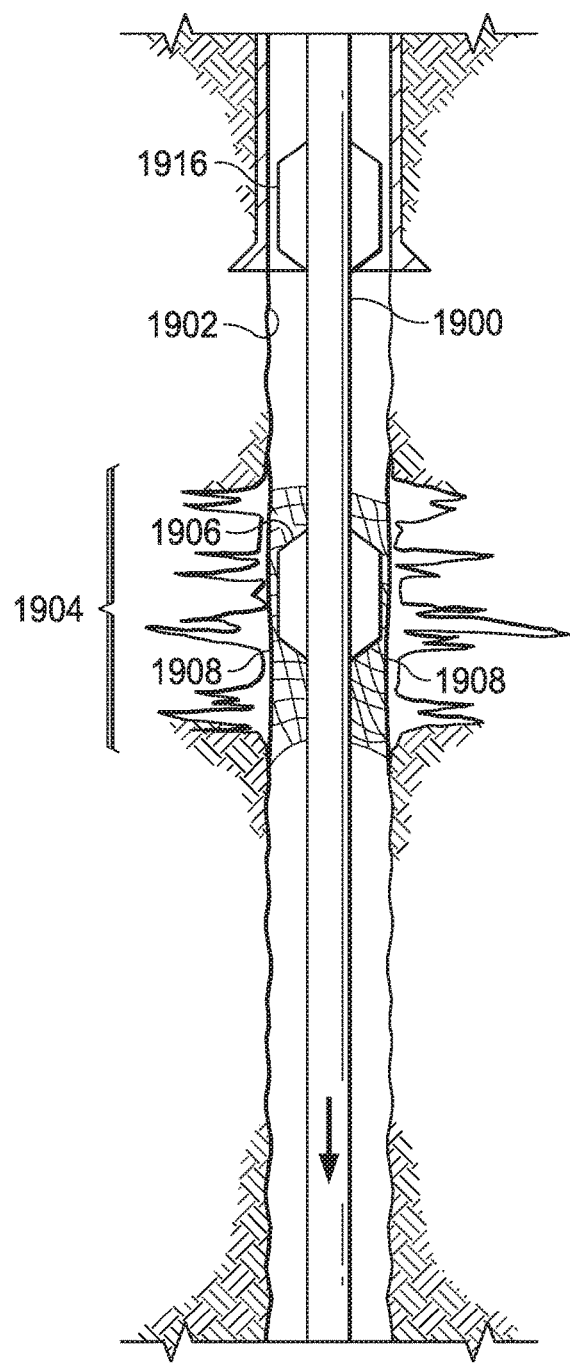

FIGS. 19A, 19B, and 19C are downhole images illustrating the deployment of an LCF or a plurality of LCFs from an LCFDS or a plurality of LCFDSs, respectively. Moreover, FIGS. 19A, 19B, and 19C illustrate deployment of an LCF from and LCFDS similar to the LCFDS 1300, described earlier. FIG. 19A shows a tubing string. For the purposes of the present description, the tubing string is described as a drilling string 1900, although it is to be understood that the tubing string may be another type of tubing string. The drilling string 1900 is disposed in a wellbore 1902. A lost circulation zone 1904 is present in the wellbore 1902. The drilling string 1900 includes pair of LCFDSs 1906. Although two LCFDSs 1906 are shown, additional or fewer LCFDSs may be included disposed on the drilling string 1900 about a common circumference or at different positions along the length of the drilling string 1900, or both. An LCF 1908 is stored in a housing 1910 of each LCFDS 1906. Each LCF 1908 is connected to at least one actuator 1912 via a connector 1914. The actuators 1912 are contained within a housing 1916. In some implementations, each LCF 1908 is connected to a pair of actuator 1912, in a manner, for example, as shown in FIG. 13. In some implementations, the actuator 1912 is bobbin coupled to a motor, which may be similar to and operate similarly to the bobbin 1326 and motor 1328, respectively, described earlier.

Referring to FIG. 19A, the drilling string 1900 is moved in a downhole direction towards the lost circulation zone 1904. As the LCFDSs 1906 reach a location proximate to the loss circulation zone 1904, onboard sensors of the LCFDSs 1906 operate to detect the presence of the lost circulation zone 1904. When the sensors of the LCFDSs 1906 detect the lost circulation zone 1904, movement of the drilling string 1900 is ceased when the housings 1916 are at a position uphole of the lost circulation zone. If downhole movement of the drilling string 1900 has caused the housings 1916 to be positioned downhole of the lost circulation zone 1904, the drilling string 1900 is moved uphole until the housings 1916 are positioned uphole of the lost circulation zone 1904.

In the present implementation, when the LCFDSs 1906 detect the presence of the lost circulation zone 1904 and the housings 1916 are positioned uphole of the lost circulation zone 1904, as shown in FIG. 19B, the LCFDSs 1906 deploy the LCFs 1908. Particularly, the actuators 1912 withdraw the LCFs 1908 from the associated housing 1910 and unfold and spread the LCFs 1908 to extend along a length of the lost circulation zone 1904. In some implementations, the LCFs 1908 extend along an entire length of the lost circulation zone 1904. Drilling mud flows through an annular space 1918 formed between the drilling string 1900 and the wellbore surface 1920. Differential pressure at the lost circulation zone 1904 associated with drilling mud flowing into the lost circulation zone 1904, draws the LCFs 1908 against the wellbore surface 1820. As a result, the LCFs 1908 cover at least portions of the lost circulation zone 1904, forming a seal, thereby reducing or preventing the flow of drilling mud into the lost circulation zone 1904.

The LCFDSs 1906 are programmed to permit a preselected period of time to elapse after deployment of the associated LCFs 1908. This time period allows, for example, the full deployment of the LCFs 1908 and application of the LCFs 1908 to the wellbore surface 1920 at the lost circulation zone 1904. Upon elapse of the period of time, the LCFs 1908 are separated from the associated LCFDSs 1906. With the LCFs 1908 in position and providing a barrier to lost circulation, the drilling string 1900 is continued to be moved downhole, as shown in FIG. 19C. In some instances, a spot treatment with LCM may be used to form a better seal at the lost circulation zone. Spot treatment of a lost circulation zone with LCM is performed to maintain positive downhole pressure and allow for continued drilling.

The process illustrated in FIGS. 19A, 19B, and 19C may be autonomously performed. Particularly, deployment of the LCFs 1908 may be autonomously deployed by a controller disposed within the LCFDSs 1906. In some implementations, the entirety of the process represented in FIGS. 19A, 19B, and 19C may be autonomously performed, including deployment of the LCFs 1808 and movement of the drilling string 1900 to place the LCFDSs 1906 in a predetermined position relative to the lost circulation zone 1904. For example, movement of drilling string 1900 may be autonomously controlled by a controller located, for example, at a surface of the earth may be in communication with a controller contained with each of the LCFDSs 1906 to control deployment of the LCFs 1908.

Figure 20:
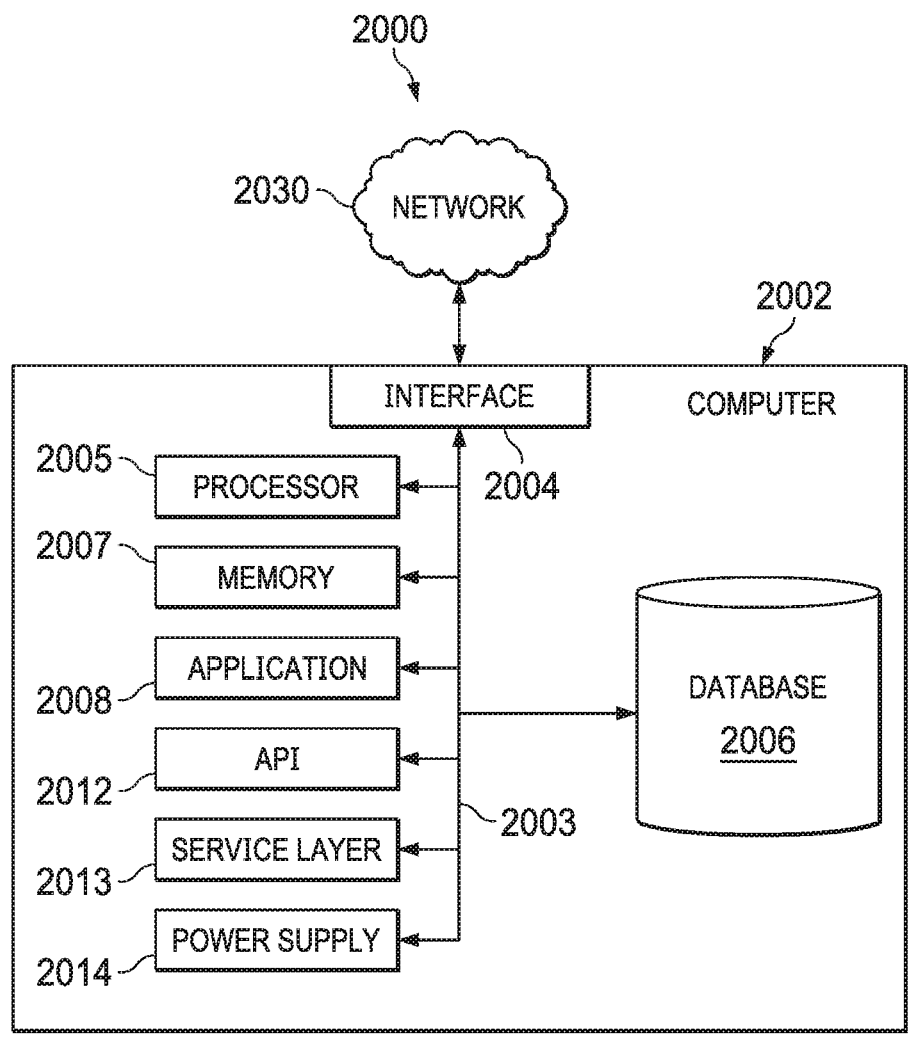
FIG. 20 is a block diagram illustrating an example computer system used to provide computational functionalities associated with described algorithms, methods, functions, processes, flows, and procedures as described in the present disclosure, according to some implementations of the present disclosure.

FIG. 20 is a block diagram of an example computer system 2000 used to provide computational functionalities associated with described algorithms, methods, functions, processes, flows, and procedures described in the present disclosure, according to some implementations of the present disclosure. The illustrated computer 2002 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 2002 can include input devices such as keypads, keyboards, and touch screens that can accept user information. Also, the computer 2002 can include output devices that can convey information associated with the operation of the computer 2002. The information can include digital data, visual data, audio information, or a combination of information. The information can be presented in a graphical user interface (UI) (or GUI).

The computer 2002 can serve in a role as a client, a network component, a server, a database, a persistency, or components of a computer system for performing the subject matter described in the present disclosure. The illustrated computer 2002 is communicably coupled with a network 2030. In some implementations, one or more components of the computer 2002 can be configured to operate within different environments, including cloud-computing-based environments, local environments, global environments, and combinations of environments.

At a high level, the computer 2002 is an electronic computing device operable to receive, transmit, process, store, and manage data and information associated with the described subject matter. According to some implementations, the computer 2002 can also include, or be communicably coupled with, an application server, an email server, a web server, a caching server, a streaming data server, or a combination of servers.

The computer 2002 can receive requests over network 2030 from a client application (for example, executing on another computer 2002). The computer 2002 can respond to the received requests by processing the received requests using software applications. Requests can also be sent to the computer 2002 from internal users (for example, from a command console), external (or third) parties, automated applications, entities, individuals, systems, and computers.

Each of the components of the computer 2002 can communicate using a system bus 2003. In some implementations, any or all of the components of the computer 2002, including hardware or software components, can interface with each other or the interface 2004 (or a combination of both), over the system bus 2003. Interfaces can use an application programming interface (API) 2012, a service layer 2013, or a combination of the API 2012 and service layer 2013. The API 2012 can include specifications for routines, data structures, and object classes. The API 2012 can be either computer-language independent or dependent. The API 2012 can refer to a complete interface, a single function, or a set of APIs.

The service layer 2013 can provide software services to the computer 2002 and other components (whether illustrated or not) that are communicably coupled to the computer 2002. The functionality of the computer 2002 can be accessible for all service consumers using this service layer. Software services, such as those provided by the service layer 2013, can provide reusable, defined functionalities through a defined interface. For example, the interface can be software written in JAVA, C++, or a language providing data in extensible markup language (XML) format. While illustrated as an integrated component of the computer 2002, in alternative implementations, the API 2012 or the service layer 2013 can be stand-alone components in relation to other components of the computer 2002 and other components communicably coupled to the computer 2002. Moreover, any or all parts of the API 2012 or the service layer 2013 can be implemented as child or sub-modules of another software module, enterprise application, or hardware module without departing from the scope of the present disclosure.

The computer 2002 includes an interface 2004. Although illustrated as a single interface 2004 in FIG. 20, two or more interfaces 2004 can be used according to particular needs, desires, or particular implementations of the computer 2002 and the described functionality. The interface 2004 can be used by the computer 2002 for communicating with other systems that are connected to the network 2030 (whether illustrated or not) in a distributed environment. Generally, the interface 2004 can include, or be implemented using, logic encoded in software or hardware (or a combination of software and hardware) operable to communicate with the network 2030. More specifically, the interface 2004 can include software supporting one or more communication protocols associated with communications. As such, the network 2030 or the interface's hardware can be operable to communicate physical signals within and outside of the illustrated computer 2002.

The computer 2002 includes a processor 2005. Although illustrated as a single processor 2005 in FIG. 20, two or more processors 2005 can be used according to particular needs, desires, or particular implementations of the computer 2002 and the described functionality. Generally, the processor 2005 can execute instructions and can manipulate data to perform the operations of the computer 2002, including operations using algorithms, methods, functions, processes, flows, and procedures as described in the present disclosure.

The computer 2002 also includes a database 2006 that can hold data for the computer 2002 and other components connected to the network 2030 (whether illustrated or not). For example, database 2006 can be an in-memory, conventional, or a database storing data consistent with the present disclosure. In some implementations, database 2006 can be a combination of two or more different database types (for example, hybrid in-memory and conventional databases) according to particular needs, desires, or particular implementations of the computer 2002 and the described functionality. Although illustrated as a single database 2006 in FIG. 20, two or more databases (of the same, different, or combination of types) can be used according to particular needs, desires, or particular implementations of the computer 2002 and the described functionality. While database 2006 is illustrated as an internal component of the computer 2002, in alternative implementations, database 2006 can be external to the computer 2002.

The computer 2002 also includes a memory 2007 that can hold data for the computer 2002 or a combination of components connected to the network 2030 (whether illustrated or not). Memory 2007 can store any data consistent with the present disclosure. In some implementations, memory 2007 can be a combination of two or more different types of memory (for example, a combination of semiconductor and magnetic storage) according to particular needs, desires, or particular implementations of the computer 2002 and the described functionality. Although illustrated as a single memory 2007 in FIG. 20, two or more memories 2007 (of the same, different, or combination of types) can be used according to particular needs, desires, or particular implementations of the computer 2002 and the described functionality. While memory 2007 is illustrated as an internal component of the computer 2002, in alternative implementations, memory 2007 can be external to the computer 2002.

The application 2008 can be an algorithmic software engine providing functionality according to particular needs, desires, or particular implementations of the computer 2002 and the described functionality. For example, application 2008 can serve as one or more components, modules, or applications. Further, although illustrated as a single application 2008, the application 2008 can be implemented as multiple applications 2008 on the computer 2002. In addition, although illustrated as internal to the computer 2002, in alternative implementations, the application 2008 can be external to the computer 2002.

The computer 2002 can also include a power supply 2014. The power supply 2014 can include a rechargeable or non-rechargeable battery that can be configured to be either user- or non-user-replaceable. In some implementations, the power supply 2014 can include power-conversion and management circuits, including recharging, standby, and power management functionalities. In some implementations, the power-supply 2014 can include a power plug to allow the computer 2002 to be plugged into a wall socket or a power source to, for example, power the computer 2002 or recharge a rechargeable battery.

There can be any number of computers 2002 associated with, or external to, a computer system containing computer 2002, with each computer 2002 communicating over network 2030. Further, the terms "client," "user," and other appropriate terminology can be used interchangeably, as appropriate, without departing from the scope of the present disclosure. Moreover, the present disclosure contemplates that many users can use one computer 2002 and one user can use multiple computers 2002.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as standalone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A lost circulation fabric (LCF) deployment system (LCFDS) for deploying an LCF at a lost circulation zone within a wellbore, the LCFDS comprising:
   a housing configured to be coupled to a tubular, the housing defining a cavity;
   an opening formed in the housing, the opening providing communication between the cavity and an exterior of the housing;
   a door moveable between a closed position to cover the opening formed in the housing and an opened position to uncover the opening formed in the housing;
   an LCF disposed in the cavity;
   a float coupled to the LCF, the float comprising a material having a mass density less than a mass density of drilling mud such that the float is buoyant when in the drilling mud; and
   a release system coupled to the LCF, the release system operable to move the door between the closed position and open position to permit deployment of the LCF.

2. The LCFDS of claim 1, wherein the float is operable to deploy the LCF from the opening formed in the housing.

3. The LCFDS of claim 1, wherein the housing is sized and shaped to reside within an annular space within a wellbore between the tubular and a wall of the wellbore.

4. The LCFDS of claim 1, wherein the LCF comprises a flexible mesh material.

5. The LCFDS of claim 4, wherein the flexible mesh material is a fiber-reinforced polymer.

6. The LCFDS of claim 1, further comprising a controller and a sensor, the controller operable to receive data from the sensor to detect a presence of a lost circulation zone and to actuate the release system to deploy the LCF in response to detection of a lost circulation zone.

7. The LCFDS of claim 1, further comprising a launch system operable to forcefully eject the LCF from the opening formed in the housing during deployment of the LCF.

8. The LCFDS of claim 7, wherein the launch system comprises a compressible spring that is operable to expand to forcefully eject the LCF.

9. The LCFDS of claim 7, wherein the launch system comprises a platform moveable within the cavity of the housing, the platform operable to eject the LCF from the opening formed in the housing during deployment of the LCF.

10. The LCFDS of claim 1, wherein the LCF comprises a first end and a second end, and further comprising a compressible spring disposed between the first end and the second end, the compressible spring configured to expand upon deployment of the LCF to separate the first end and the second end.

11. The LCFDS of claim 1, wherein the LCF comprises an edge, and wherein the float is coupled to the LCF along the edge.

12. The LCFDS of claim 1, wherein the float is coupled to an end of the LCF by a cable, a string, a line, or a cord.

13. The LCFDS of claim 1, wherein the material of the float comprises a metal foam.

14. The LCFDS of claim 1, wherein the float is a first float and the LCFDS further comprises a second float coupled to the LCF.

15. The LCFDS of claim 14, wherein the first and second floats are located at opposing ends of the LCF.

16. The LCFDS of claim 1, wherein the release system is operable to release the float into the drilling mud to cause the float to rise within the drilling mud to extract the LCF from the housing.

17. A system for deploying a lost circulation fabric (LCF), the system comprising:
   a lost circulation fabric deployment system (LCFDS) configured to be coupled to a tubular, the LCFDS comprising:
      a housing defining a cavity;
      an opening formed in the housing, the opening providing communication between the cavity and an exterior of the housing;
      a door moveable between a closed position to cover the opening formed in the housing and an opened position to uncover the opening formed in the housing;
      an LCF disposed in the cavity;
      a float coupled to the LCF, the float comprising a material having a mass density less than a mass density of drilling mud such that the float is buoyant when in the drilling mud, the float operable to deploy the LCF; and
      a release system coupled to the LCF, the release system operable to move the door between the closed position and open to permit deployment of the LCF.

18. The system of claim 17, wherein the LCFDS further comprises a controller and a sensor and wherein the controller is operable to receive data from the sensor to detect a presence of a lost circulation zone and to actuate the release system to deploy the LCF in response to detection of a lost circulation zone.

19. The system of claim 17, further comprising a plurality of LCFDSs disposed in an annular arrangement and wherein the LCFs of adjacent LCFDSs are coupled together.

20. The system of claim 19, wherein the coupled LCFs form a unitary annular ring upon deployment of the LCFs.

21. The system of claim 19, wherein the plurality of LCFDSs are configured to deploy coupled LCFs simultaneously.

22. The system of claim 17, wherein the LCFDS further comprises a launch system operable to forcefully eject the LCF from the opening formed in the housing during deployment of the LCF.

23. The system of claim 22, wherein the launch system comprises a platform moveable within the cavity of the housing, the platform operable to eject the LCF from the opening formed in the housing during deployment of the LCF.

24. The system of claim 23, wherein the launch system comprises a compressible spring that is operable to expand to forcefully eject the LCF.

25. The system of claim 23, wherein the launch system comprises a platform moveable within the cavity of the housing, the platform operable to eject the LCF from the opening formed in the housing during deployment of the LCF.

* * * * *